United States Patent
Balakrishnan

(12) 
(10) Patent No.: US 11,695,440 B2
(45) Date of Patent: *Jul. 4, 2023

(54) METHODS, CIRCUITS, SYSTEMS AND APPARATUS PROVIDING AUDIO SENSITIVITY ENHANCEMENT IN A WIRELESS RECEIVER, POWER MANAGEMENT AND OTHER PERFORMANCES

(71) Applicant: TEXAS INSTRUMENTS INCORPORATED, Dallas, TX (US)

(72) Inventor: Jaiganesh Balakrishnan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,158

(22) Filed: Nov. 18, 2021

(65) Prior Publication Data

US 2022/0209807 A1 Jun. 30, 2022

Related U.S. Application Data

(60) Continuation of application No. 16/838,685, filed on Apr. 2, 2020, now Pat. No. 11,211,959, which is a (Continued)

(30) Foreign Application Priority Data

Apr. 6, 2011 (IN) .......................... 1167/CHE/2011

(51) Int. Cl.
*H04B 1/12* (2006.01)
*H04B 1/16* (2006.01)
(Continued)

(52) U.S. Cl.
CPC ................. *H04B 1/12* (2013.01); *H04B 1/10* (2013.01); *H04B 1/1027* (2013.01);
(Continued)

(58) Field of Classification Search
CPC .......... H04B 1/12; H04B 1/10; H04B 1/1027; H04B 1/1646; H04B 17/20; H04B 17/318;
(Continued)

(56) References Cited

U.S. PATENT DOCUMENTS 4,792,993 A 12/1988 Ma
5,109,542 A * 4/1992 Ecklund ................. H04H 20/49
455/142

(Continued)

FOREIGN PATENT DOCUMENTS

GB 2288936 B 9/1997

OTHER PUBLICATIONS

Broadcom Corporation, BCM2049 Product Brief, 2pp 2009.

*Primary Examiner* — Lana N Le
(74) *Attorney, Agent, or Firm* — Mandy Barsilai Fernandez; Frank D. Cimino

(57) ABSTRACT

A wireless receiver (10) includes a down converter module (210) operable to deliver a signal having a signal bandwidth that changes over time, a dynamically controllable filter module (200) having a filter bandwidth and fed by said down converter module (210), and a measurement module (295) operable to at least approximately measure the signal bandwidth, said dynamically controllable filter module (200) responsive to said measurement module (295) to dynamically adjust the filter bandwidth to more nearly match the signal bandwidth as it changes over time, whereby output
(Continued)

from said filter module (200) is noise-reduced. Other wireless receivers, electronic circuits, and processes for their operation are disclosed.

20 Claims, 9 Drawing Sheets

Related U.S. Application Data continuation of application No. 14/323,280, filed on Jul. 3, 2014, now Pat. No. 10,644,738, which is a division of application No. 13/193,088, filed on Jul. 28, 2011, now Pat. No. 8,805,312.

(51) Int. Cl.
 H04H 40/72 (2008.01)
 H04B 17/318 (2015.01)
 H04B 17/20 (2015.01)
 H04B 17/336 (2015.01)
 H04B 1/10 (2006.01)

(52) U.S. Cl.
 CPC ........... *H04B 1/1646* (2013.01); *H04B 17/20* (2015.01); *H04B 17/318* (2015.01); *H04B 17/336* (2015.01); *H04H 40/72* (2013.01); *H04B 2001/1054* (2013.01)

(58) Field of Classification Search
 CPC .......... H04B 17/336; H04B 2001/1054; H04B 11/00; H04B 3/462; H04B 10/1141; H04B 1/16; H04B 1/406; H04H 40/72; H04R 29/004; H04R 29/00; H04R 29/001; H04R 3/04; H04R 2430/03; H04R 2499/11; H04R 29/008; H04R 3/005; H04R 5/033; H04R 2227/003; H04R 23/008; H04R 3/12; H04R 2420/03; H04R 2420/05; H04R 2499/13; H04R 29/007; H04R 3/00; G01R 27/28; H04L 12/189; G06F 3/165; G06F 16/60; H04W 52/26

See application file for complete search history.

(56) References Cited

U.S. PATENT DOCUMENTS

| | | | |
|---|---|---|---|
| 5,193,213 A | 3/1993 | Chon | |
| 5,796,850 A | 8/1998 | Shiono | |
| 6,070,064 A * | 5/2000 | Inamori | H04B 7/0814 455/45 |
| 7,787,630 B2 | 8/2010 | Lerner et al. | |
| 7,797,630 B2 | 9/2010 | Kashi | |
| 7,907,740 B2 | 3/2011 | Matsuzawa | |
| 8,078,129 B2 | 12/2011 | Lindstrom et al. | |
| 8,174,415 B2 | 5/2012 | Tuttle | |
| 8,243,864 B2 | 8/2012 | Ciccarelli et al. | |
| 8,325,944 B1 | 12/2012 | Duwenhorst | |
| 8,498,596 B2 * | 7/2013 | Popescu | H04B 1/1027 455/150.1 |
| 8,805,312 B2 * | 8/2014 | Balakrishnan | H04B 17/318 455/226.1 |
| 9,130,683 B2 | 9/2015 | Murali | |
| 10,003,422 B2 | 6/2018 | Hahn | |
| 10,644,738 B2 * | 5/2020 | Balakrishnan | H04B 1/1646 |
| 10,819,457 B1 * | 10/2020 | Alaburda | H04W 84/042 |
| 11,211,959 B2 * | 12/2021 | Balakrishnan | H04H 40/72 |
| 2001/0012770 A1 | 8/2001 | Pol | |
| 2005/0277393 A1 | 12/2005 | Seo | |
| 2007/0206706 A1 | 9/2007 | Saito et al. | |
| 2007/0294496 A1 | 12/2007 | Goss et al. | |
| 2008/0181294 A1 | 7/2008 | Andrle | |
| 2008/0307240 A1 | 12/2008 | Dahan et al. | |
| 2008/0320529 A1 | 12/2008 | Louchkoff et al. | |
| 2009/0111389 A1 | 4/2009 | Crushkevich et al. | |
| 2009/0111410 A1 * | 4/2009 | Kobayashi | H04B 1/1036 455/214 |
| 2009/0191828 A1 | 7/2009 | Ibrahim et al. | |
| 2009/0247099 A1 | 10/2009 | Jaisimha et al. | |
| 2009/0311982 A1 | 12/2009 | Zhang et al. | |
| 2010/0099371 A1 | 4/2010 | Brummelman | |
| 2010/0232482 A1 | 9/2010 | Murali | |
| 2010/0232548 A1 | 9/2010 | Balakrishnan et al. | |
| 2011/0075774 A1 | 3/2011 | Hiben et al. | |
| 2011/0096875 A1 | 4/2011 | Amrutur et al. | |
| 2011/0105037 A1 | 5/2011 | Narasimha et al. | |
| 2011/0111714 A1 | 5/2011 | Balakrishnan et al. | |
| 2011/0275339 A1 | 11/2011 | Allen | |
| 2011/0299575 A1 | 12/2011 | Mikhemar et al. | |
| 2012/0026039 A1 | 2/2012 | Ganeshan et al. | |
| 2012/0028594 A1 | 2/2012 | Rao et al. | |
| 2013/0243198 A1 | 9/2013 | Van Rumpt | |
| 2013/0304459 A1 | 11/2013 | Pontoppidan | |
| 2014/0254812 A1 | 9/2014 | Quan | |
| 2014/0369508 A1 | 12/2014 | Forrester | |
| 2015/0036464 A1 | 2/2015 | Moriguchi | |
| 2015/0126144 A1 | 5/2015 | Jaisimha | |
| 2016/0365082 A1 | 12/2016 | Poulsen | |
| 2017/0070195 A1 | 3/2017 | Arknaes-Pedersen | |
| 2017/0118569 A1 | 4/2017 | Quan | |
| 2017/0161013 A1 | 6/2017 | Tachigi | |
| 2018/0211682 A1 | 7/2018 | Engel | |
| 2019/0037310 A1 | 1/2019 | Quan | |
| 2019/0179597 A1 | 6/2019 | Tull | |
| 2019/0355359 A1 | 11/2019 | Bhaya | |
| 2020/0153406 A1 * | 5/2020 | Quan | H03G 3/3005 |
| 2020/0244452 A1 * | 7/2020 | Lacava | H04L 63/0861 |
| 2021/0349683 A1 * | 11/2021 | Cremer | H03G 7/002 |

* cited by examiner

METHODS, CIRCUITS, SYSTEMS AND APPARATUS PROVIDING AUDIO SENSITIVITY ENHANCEMENT IN A WIRELESS RECEIVER, POWER MANAGEMENT AND OTHER PERFORMANCES

CROSS-REFERENCES TO RELATED APPLICATIONS

This application is a Continuation of U.S. patent application Ser. No. 16/838,685, filed Apr. 2, 2020, which is a Continuation of U.S. patent application Ser. No. 14/323,280, filed Jul. 3, 2014, which is a Divisional of U.S. patent application Ser. No. 13/193,088 filed Jul. 28, 2011, now U.S. Pat. No. 8,805,312, which is related to India Patent Application 1167/CHE/2011 "Methods, Circuits, Systems and Apparatus Providing Audio Sensitivity Enhancement in an FM Receiver, Power Management and/or Other Performances" (TI-69918IndiaPS) filed Apr. 6, 2011, for which priority is claimed under the Paris Convention and 35 U.S.C. 119 and all other applicable law, and which are incorporated herein by reference in their entirety.

This application is related to India Patent Application 1010/CHE/2011 "Rapid Autonomous Scan in FM or Other Receivers with Parallel Search Strategy, and Circuits, Processes and Systems" (TI-69599IndiaPS) filed Mar. 30, 2011, for which priority is claimed under the Paris Convention and 35 U.S.C. 119 and all other applicable law, and which is incorporated herein by reference in its entirety.

BACKGROUND

This invention pertains to wireless receivers. Without limitation, the background is described in connection with FM receivers. FM is popular in many developed countries and is growing in popularity in a number of developing countries for all kinds of receiver and devices including them.

With the growing popularity of FM transmission in a number of developing countries, as well as the developed countries, low-cost integrated FM receivers have become important to integrate into mobile handsets like cell phones and Internet devices as well as FM-supporting integrated circuits of various types for those and other products.

In FM (frequency modulation) receivers, audio sensitivity is a key parameter that determines the weakest received signal that can be demodulated with acceptable audio quality. Moreover, audio sensitivity is a problematic and important parameter for FM receivers as it can be perceived by the user. Improving the audio sensitivity is appealing both to manufacturers and to the user public because it enhances the range or distance a receiver can be located away from a given transmitter, and improves reception in various reception scenarios.

Finding ways to make audio sensitivity higher is a continuing challenge to the art. Moreover, consideration of ways to increase audio sensitivity encounters problems of increased current consumption and/or degradation of other performance parameters. In the mobile segment, any incremental current consumption to achieve an audio sensitivity improvement needs to be small or negligible, as the time between battery recharges is another key concern in mobile devices.

The audio sensitivity in FM receivers is suitably defined as the minimum signal strength at the RF (radio frequency) input of the FM receiver that results in a specified demodulated audio signal to noise ratio (SNR). The audio sensitivity performance for FM is measured for a specified audio frequency deviation in vibrations per second or kilohertz (KHz).

In the United States and Europe, FM broadcast stations use a bandwidth of 200 KHz assigned to them at different frequencies or positions within the 87.5 MHz to 108 MHz. In Japan the FM band or available frequency spectrum is a 76 MHz to 90 MHz band. There, an FM channel can be centered at multiples of 50 KHz, with a frequency spacing of at least 200 KHz between any two valid stations. The FM center frequency can be centered at multiples of 50 KHz in some parts of the world and at multiples of 100 KHz in other parts of the world.

In FIG. 3, a MPX (multiplex) signal is shown in a spectrum diagram of amplitude versus frequency carrying stereo left L and right R audio signals for ultimate listening, but in a combined form. The FM MPX signal has a mono (L+R) component at audio frequency, a pilot at 19 KHz, a stereo difference component—left minus right (L−R)—translated up around 38 KHz, and an RDS (radio data system) signal. (An FM receiver can use a radio data system (RDS) circuit or a radio broadcast data system (RBDS) circuit for processing specific data, e.g., station identification, song title, time, program identification, and name of artists, received from an FM broadcast station.)

The audio signals, pilot signal and RDS signal components can have different spectrum amplitudes vertically, as graphed across the horizontal frequency axis of FIG. 3, and they combine together in a complicated but straightforward way to form the instantaneous modulating MPX signal in the time domain. The FM carrier of a given FM broadcast station is frequency modulated (FM) by that time domain MPX signal to generate its FM broadcast signal. Frequency deviation on the outside or leftmost vertical axis of FIG. 3 is the amount of frequency variation of the FM broadcast signal at RF that a given combined time domain varying instantaneous voltage of a MPX modulating signal causes, as indicated by the encompassing dotted line in FIG. 3. The audio signals, etc. of the MPX signal are frequency modulated (FM) onto the RF carrier at the FM transmitter. The frequency of the RF carrier with no modulation corresponds to the nominal frequency location of the FM signal in the FM radio band.

Thus the audio signals combined as L+R and L−R are frequency modulated (FM) onto an RF carrier, and the occupied RF channel bandwidth is approximately indicated by the outside vertical axis in FIG. 3. That occupied RF channel bandwidth, also called the audio deviation here, depends on the instantaneous amplitude of the time-domain MPX signal. Hence the audio deviation can vary significantly. A loud audio signal causes a large audio deviation, meaning that the FM carrier at RF is modulated to vary in frequency over a wider frequency range at RF than it would with a soft audio signal. Notice that the RF amplitude of the transmitted FM signal from the FM broadcast station does not vary in a significant way with the audio loudness. The RF amplitude, as well as RF SNR (signal-to-noise ratio), do depend on the power of the FM broadcast station, the distance to the receiver, terrain and obstacles to propagation. According to the regulations of most countries, the FM broadcast signal can have an occupied bandwidth of up to 75 KHz, and the actual occupied bandwidth is determined by the combined intensities or amplitudes across the spectrum of FIG. 3.

The audio sensitivity of an FM receiver in one possible approach might be improved by reducing the noise figure of the analog RF front-end of the FM receiver. However, noise figure reduction comes at the cost of increased current consumption that leads to shorter battery life in mobile devices, as well as potentially increased integrated circuit chip area that means the chip is more costly to make. For instance, reducing the noise figure of the FM receiver from 5 dB to 3 dB might increase the electric current consumption of an analog front-end electronic receiving circuit by milliamperes. This means more drain on the battery and shorter battery life and more recharges called for, which can inconvenience the user.

Remarkable new ways and departures to increase the audio sensitivity would thus be very desirable in this technological art—while substantially controlling current consumption and preserving concomitant battery life, and maintaining other performances undegraded like Total Harmonic Distortion and RDS sensitivity, and keeping the integrated circuit chip area economical.

SUMMARY OF THE INVENTION

Generally, and in one form of the invention, a wireless receiver includes a down converter module operable to deliver a signal having a signal bandwidth that changes over time, a dynamically controllable filter module having a filter bandwidth and fed by said down converter module, and a measurement module operable to at least approximately measure the signal bandwidth, said dynamically controllable filter module responsive to said measurement module to dynamically adjust the filter bandwidth to more nearly match the signal bandwidth as it changes over time, whereby output from said filter module is noise-reduced.

Generally, another form of the invention involves an electronic power management circuit for a wireless receiver, and the circuit includes a front-end operable to down-convert a wireless signal to a low-intermediate frequency (IF); and a digital processor circuit operable to provide a controllable mode-enabled and mode-disabled set of modules including a de-rotator to convert at least a signal channel from IF to a baseband signal, a channel select filter fed by the de-rotator and including multiple stages, a demodulator, and a stereo decoder, said digital processor circuit operable to differently power manage the modules and stages depending on modes including a pre-reception mode and a regular reception mode, the regular reception mode having audio sensitivity enhancement states of operation.

Generally, one process form of the invention involves a process of operating a wireless receiver, the process including altering a filter characteristic including a bandwidth of filter passband dynamically depending on a modulated wireless signal condition involving at least one signal frequency.

Generally, another process form of the invention involves a process of reducing in-band noise in an FM receiver, the process including dynamically decreasing the bandwidth of a channel select filter to more nearly match with the varying signal bandwidth when an audio deviation is lower due to lower modulating sound level.

Other wireless receivers, electronic circuits, and processes for their operation are disclosed and claimed.

BRIEF DESCRIPTION OF THE DRAWINGS

FIG. 3 also includes an outside or leftmost vertical axis representing corresponding FM audio deviation or frequency deviation at RF.

FIG. 6A is a composite graph further detailing the embodiments of FIGS. 2, 4, 5 and 6, wherein FIG. 6A shows low-pass filter LPF response magnitude (dB) versus frequency (kHz) having superimposed plots of a) 100 KHz cumulative filter response (first and second filter stages together in a Mode 0), b) 50 kHz cumulative filter response (first and second filter stages together in a Mode 1), and c) wider bandwidth first filter stage response.

FIG. 7 is a composite graph further detailing the embodiments of FIGS. 2, 4, 5 and 6, wherein FIG. 7 shows a difference (dB on vertical axis) of filter output level IQI for 50 KHz LPF path minus filter output level SQI for 100 kHz LPF path, graphed versus audio deviation (kHz on horizontal axis), with FIG. 7 providing three such plots corresponding to three different levels of RF SNR (signal to noise ratio), and further having a dotted line signifying an energy difference threshold.

FIG. 8 is a composite graph further detailing the embodiments of FIGS. 2, 4, 5 and 6, wherein FIG. 8 shows output of an audio deviation estimation module in estimated KHz on vertical axis, graphed versus actual audio deviation (kHz on horizontal axis), with FIG. 7 providing three such plots corresponding to three different levels of RF SNR (signal to noise ratio), and further having dotted lines signifying thresholds for the estimated frequency deviation.

FIG. 9 is a composite graph further detailing the embodiments of FIGS. 2, 4, 5 and 6, wherein FIG. 9 shows audio SNR (dB on vertical axis) for demodulated Monaural (Mono) and pilot, graphed versus actual audio deviation (kHz on horizontal axis), with FIG. 9 providing three such plots corresponding to different filters and SNR, and further having a dotted line signifying a sensitivity threshold.

FIG. 10 is a composite graph further detailing the embodiments of FIGS. 2, 4, 5 and 6, wherein FIG. 10 shows audio SNR (dB on vertical axis) graphed versus RF SNR (dB on horizontal axis), holding Audio deviation constant at 22.5 kHz, with FIG. 10 providing two plots corresponding to different filters or operational modes indicating improved audio sensitivity resulting from use of an embodiment.

FIG. 11 is a composite graph further detailing the embodiments of FIGS. 2, 4, 5 and 6, wherein FIG. 10 shows filter switching click probability (logarithmically on vertical axis) graphed versus RF SNR (dB on horizontal axis), with FIG. 10 providing two plots corresponding to different filters or operational modes illustrating satisfactory minimization of click artifacts while providing improved audio sensitivity as in FIG. 10 at lower RF SNRs.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

In some embodiments, circuits and processes detect the received signal characteristics and modify the receiver parameters to improve audio sensitivity, without degrading other performance parameters.

Also, in some of the embodiments, dynamic channel select filters and filtering processes are provided to enhance the audio sensitivity with minimal increase in current consumption and simultaneously ensure that other performance parameters are not degraded.

Let the Audio Sensitivity in an FM receiver mean the minimum signal strength at the RF input that results in a demodulated audio SNR (signal to noise ratio) of, e.g., 26 dB. The Audio Sensitivity performance is measured, for example, while holding the FM frequency deviation constant and corresponding to a moderately soft audible sound level. Such frequency deviation is also called audio deviation herein and is held constant, e.g., at 22.5 kHz.

Some of the embodiments remarkably and significantly reduce in-band noise by dynamically tightening the bandwidth of a channel select filter to match with the varying signal bandwidth, so that the filter bandwidth is decreased when the audio deviation is lower (due to lower modulating sound level). Conversely, such decreased filter bandwidth is relaxed or increased when the audio deviation is higher (due to higher modulating sound level).

Figure 10:
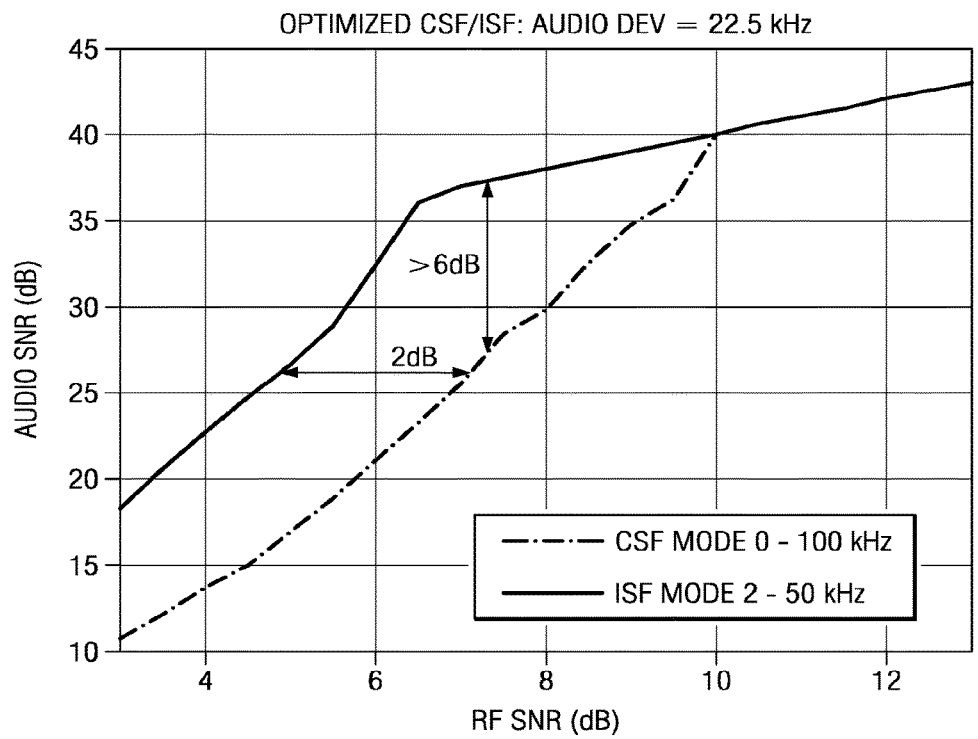

The audio SNR performances for a 100 KHz and 50 KHz channel select filter bandwidth are illustrated in FIG. 10 for an audio deviation of 22.5 KHz (softer audio). Embodiments for selective, dynamic use of a channel select filter CSF, e.g. with a bandwidth of 50 KHz for filtering the FM channel prior to FM demodulation, improve Audio Sensitivity performance by approximately 2 dB (see horizontal double arrow in FIG. 10) over a wide range of lower RF SNR values below 10 dB. Such embodiments thus deliver the Audio Sensitivity improvement or improved Audio SNR performance where it is most desirable—at such lower RF SNR values.

The improved Audio Sensitivity confers a wider geographic reception range and more reliable reception in some buildings and urban canyons that can otherwise be problematic. Moreover, Audio SNR is improved by 6 dB or more (see vertical double arrow in FIG. 10) at RF SNR values below about 8 dB, which means that the quality of reception is improved at particular reception locations generally.

One type of embodiment improves audio sensitivity dynamically under specified conditions by selectively introducing a fixed but reduced channel select filter bandwidth, say 50 KHz, when the audio is softer and audio deviation is less, and relaxing the channel select filter bandwidth, e.g. to 100 KHz, when the audio is louder and audio deviation is therefore greater. The relaxation part of the dynamics prevents an FM demodulated audio signal from being distorted. Distortion means increased THD (Total Harmonic Distortion). Such distortion could likely occur if the filter bandwidth were held static (constant) at 50 KHz. since the frequency deviation of the FM signal would frequently vary above the filter bandwidth of 50 KHz as well as within it. Notwithstanding the introduction of the narrow filter bandwidth, a linear relationship is nevertheless remarkably provided and dynamically maintained in the described embodiments between demodulated audio voltages or digital signal values and the varying frequency deviation of the FM signal. Dynamic maintenance of that linear relationship keeps THD low and quite satisfactory.

Figure 1:
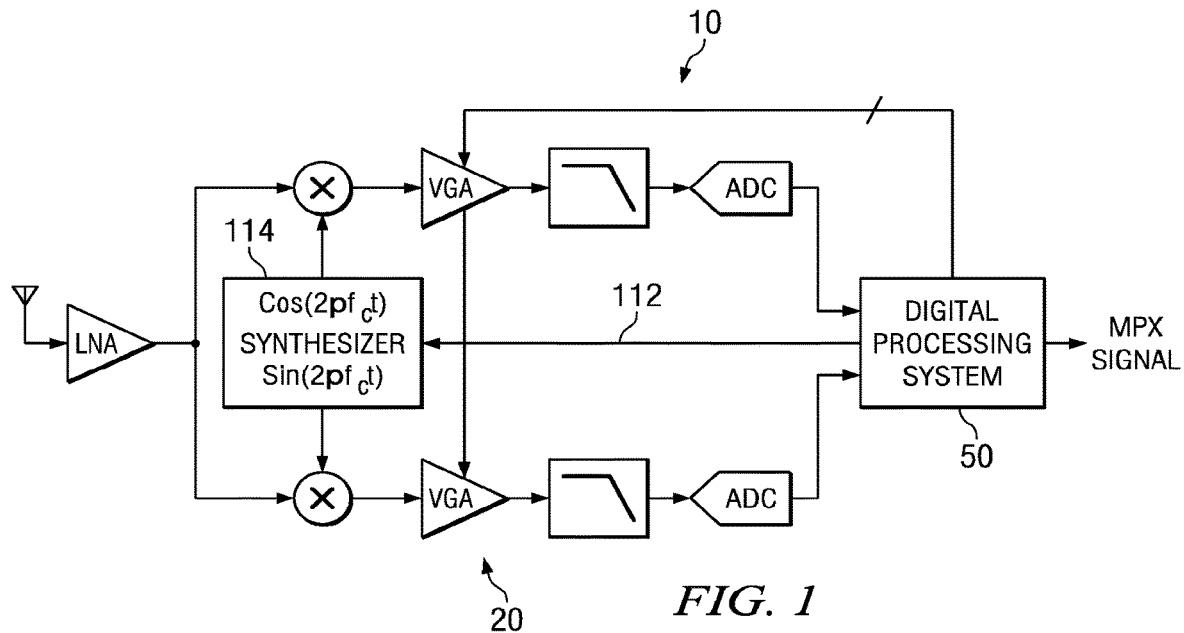
FIG. 1 is a block diagram of a receiver embodiment improved as in the other Figures.
Figure 2:
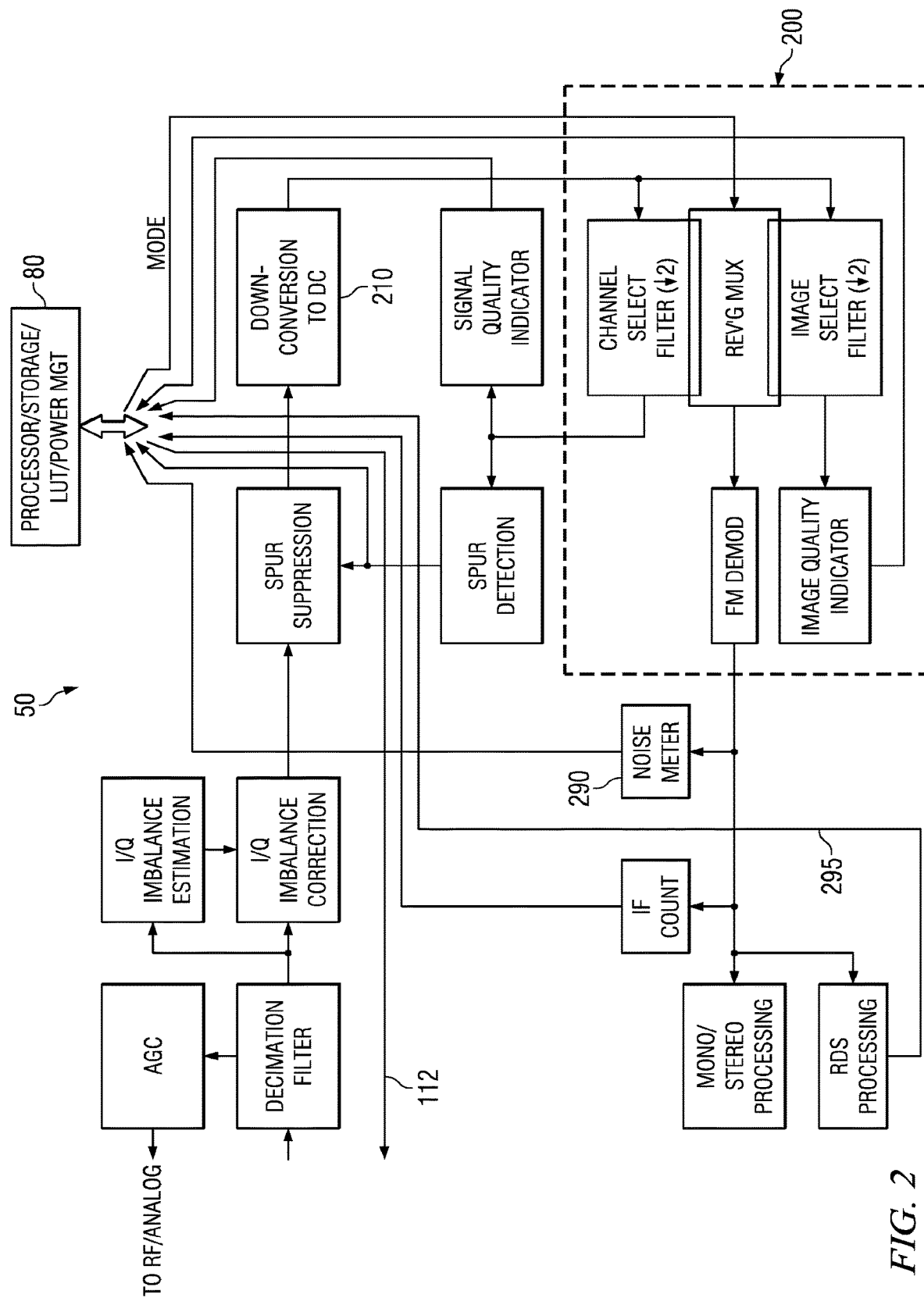
FIG. 2 is a partially block, partially process, diagram detailing a digital processing embodiment for a section of the receiver in FIG. 1.

In FIG. 1, an FM receiver embodiment 10 has an RF front end 20 followed by a digital processing section 50. In FIG. 2, the digital processing section 50 has a processor 80 (including a storage circuitry) that configures, controls and executes the illustrated process blocks in digital processing section 50. Digital processing section 50 includes a baseband section 200 of FIG. 2, which is further detailed in FIGS. 4 and 5. FIG. 5 shows a control flow applied by processor 80 to baseband section 200, and FIG. 4 details blocks in the baseband section 200 to which the control flow is applied. For some background on some FM receiver technology, see U.S. Pat. No. 7,797,630 "FM Stereo Decoder Incorporating Costas Loop Pilot to Stereo Component Phase Correction" dated Aug. 31, 2010, which is hereby incorporated herein by reference in its entirety.

Figure 5:
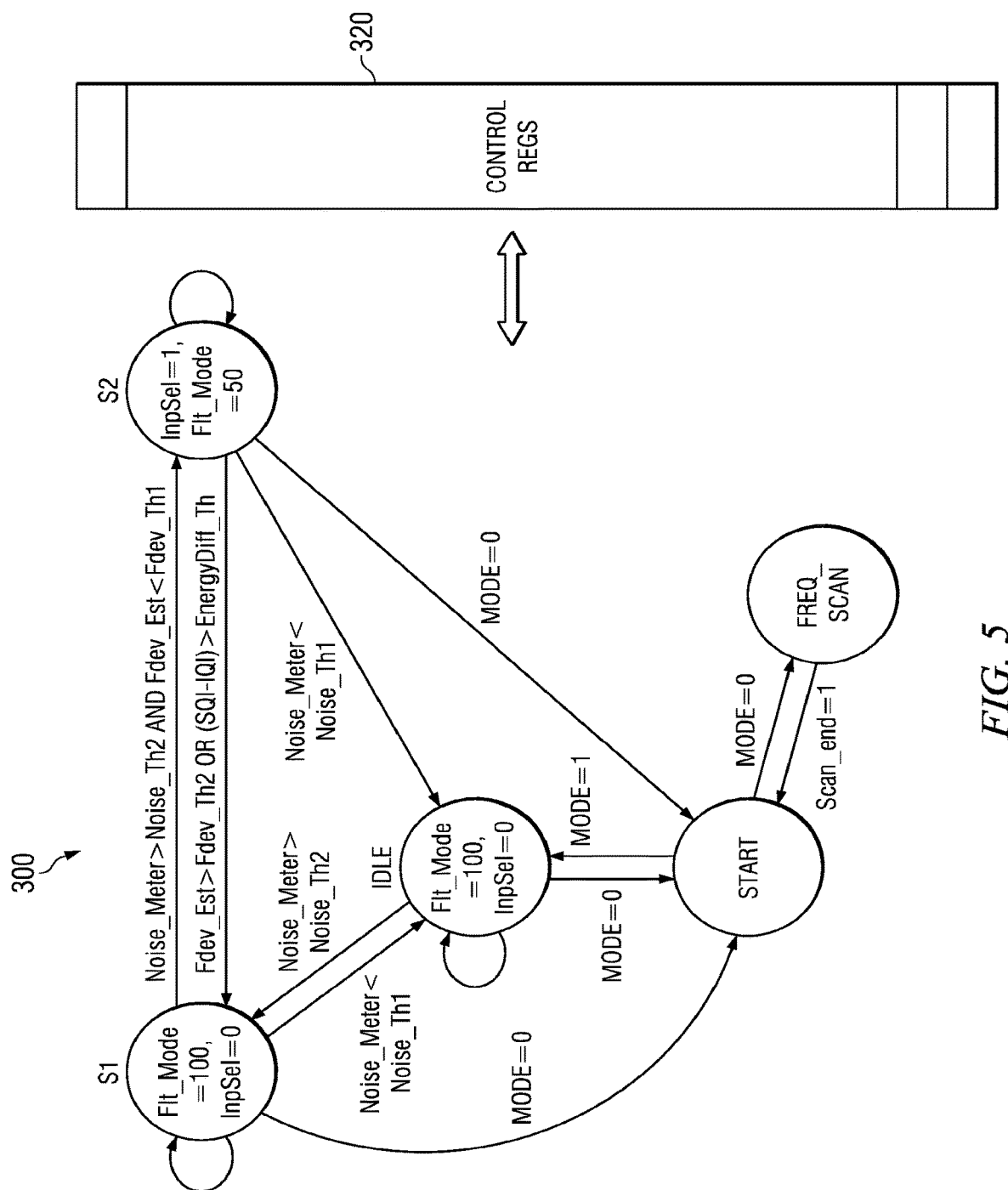
FIG. 5 is a process flow diagram for a process embodiment for audio sensitivity control and power management in FIGS. 2 and 4, and the FIG. 5 flow diagram also represents either firmware or a state transition diagram for implementation in the digital processing embodiment of FIG. 2.
Figure 6:
FIG. 6. is a generalized process flow diagram of operations for de-rotation and two-stage filtering in the embodiment of FIG. 4.

Note in FIGS. 1 and 2 the digital processing system 50 has A) operations that control a frequency synthesizer 114 in RF front end 20 to tune to one or more channels pertaining to a frequency position in an RF band, as well as B) control operations in baseband section 200 of FIG. 2 and FIGS. 5-6 that are focused on control of differing-width filtering blocks just ahead of demodulation and can also utilize measurements that precede, and/or follow or are derived from the demodulation. Pre-demodulation measurements or metrics can be used to derive signal channel levels at IF under two or more different widths of filtering for use in deriving such controls to improve audio sensitivity herein. Post-demodulation measurements or controls can also be executed, such as for demodulated audio envelope and noise, and the control operations can be made responsive thereto as well. (In a receiver embodiment, as in FIG. 1 for example, frequency synthesizer 114 is controlled to tune to one or more channels in the band concurrently, such as a signal channel and an image, and further control operations may involve channel and image filtering blocks in section 200 prior to demodulation (e.g., FM demod), such as for frequency scanning purposes, see incorporated application TI-69599IndiaPS. Pre-demodulation measurements for such frequency scanning are executed on a signal channel herein, and at least one more channel such as an image channel.)

Figure 3:
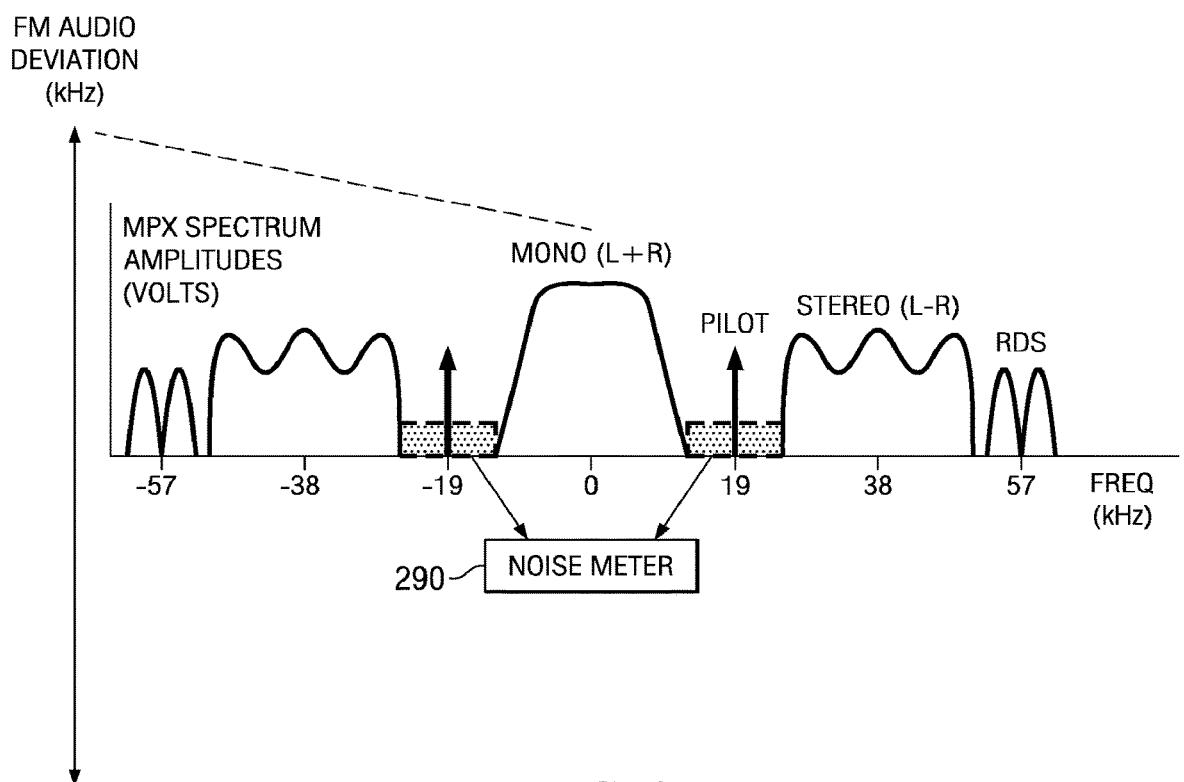
FIG. 3 is a spectrum diagram of amplitude on an inside vertical axis versus baseband frequency on the horizontal axis and detailing a multiplex (MPX) signal spectrum FM demodulated in an FM receiver embodiment of FIGS. 1-2.
Figure 4:
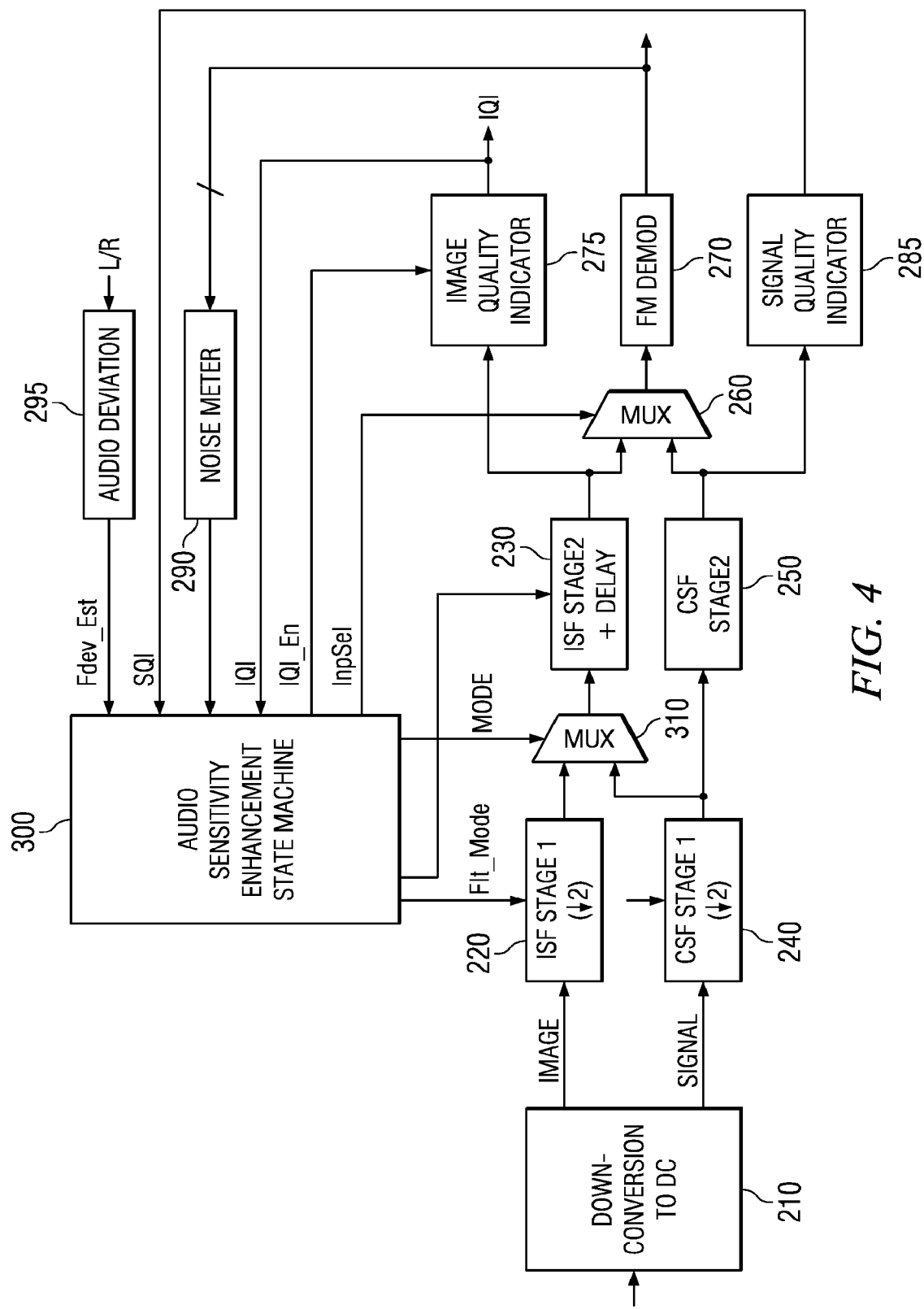
FIG. 4 is a process flow or block diagram detail for a baseband module embodiment providing mode-driven channel signal filtering and image signal filtering and switching (multiplexing) prior to FM demodulation in the digital processing embodiment of FIG. 2.

In FIGS. 1, 2 and 4, reception of each FM station has circuits or process modules for (i) Synthesizer tuning, (ii) AGC convergence (iii) I/Q Imbalance Estimation, and (iv) Measuring the metrics described herein above and elsewhere herein to determine a valid station or an invalid/empty channel and provide appropriate controls. In FIG. 1, a low noise amplifier LNA amplifies signals from an antenna and feeds the amplified signals to quadrature down-converters (X) for which the synthesizer 114 provides quadrature local oscillator signals $\cos(2\pi f_{LO} t)$ and $\sin(2\pi f_{LO} t)$. A variable gain amplifier VGA for each quadrature path I, Q supplies an output to a respective low pass filter (or respective band pass filter) to recover a desired product of down conversion at an intermediate frequency (IF). Subsequent ADCs (analog to digital conversion) provide I/Q digital signal inputs in quadrature to digital processing system 50. The digital processing system 50 feeds back respective automatic gain controls AGC to each VGA. In FIG. 2, digital processing system 50 down converts from IF to baseband ("DC"), de-modulates at baseband to supply a FIG. 3 multiplex signal MPX at baseband, and applies stereo decoding to deliver left and right channel stereo audio as its output, see FIGS. 1 and 2.

In FIG. 2, some embodiments provide all the digital blocks by an electronic circuit 50 for the FM receiver that has an electronic processor 80 for down-conversion of modulated FM to baseband and also to demodulate and process resulting demodulated FM audio and RDS. An electronic instruction storage is included with the electronic processor 80 so that the electronic processor operates in accordance with the instructions as taught herein and that are stored in the storage. FIGS. 2, 4 and 5, for instance represent operations that are suitably implemented by such stored instructions for such embodiments. (While some other embodiments can implement some or all of the FIG. 2 blocks in hardware, the description herein largely describes a programmable-processor-based digital signal processing approach.) At least a portion of storage represents the various blocks as shown in FIG. 2, such as decimation filters, AGC, IQ Imbalance estimation and correction, spur suppression, down-conversion 210, baseband processing 200 including filtering, spur detection, and FM demodulation, see also block 280 of FIG. 4. Further, such storage has blocks for downstream difference filtering, IF count, and mono/stereo decoding from the MPX signal of FIG. 3, and volume control thereof, and RDS processing.

In FIG. 3, a measurement process on the noise in the desired signal channel or signal band herein is designated as Noise Meter 290 in FIGS. 2-4. In FIG. 3, Noise Meter 290 provides an estimate of the noise level that is measured by removing the pilot strength from the total signal strength in a 15 kHz-23 kHz band in a spectrum of the FM-demodulated MPX signal. Some of the pseudocode control sequences herein also include and utilize instances of measured noise meter level. If the measured noise level is less than a threshold (such as noise variance value $\sigma_n^2$ less than a threshold Noise_Th), it implies that the received signal condition is above sensitivity. Other metrics like mean-squares SQI and IQI, IF Count and measurements from a Spur Detector inside the processor are derived in FIG. 2. IF Count represents the nominal center frequency of the in-band channel. IF count block detects existence of signal, if the absolute value of the IF count is below a threshold value $\Delta f$ based on a maximum expected mismatch (e.g., +/−200 ppm or about 21.6 KHz) between frequencies of a remote transmitter and the receiver.

The frequency $f_{LO}$ of the synthesizer 114 and the RF/analog mixers (X) and filters in FIG. 1 are set to deliver frequency subtraction to approximately a low intermediate frequency designated $f_{IF}$. Without limitation, designate the signal band to be the band that corresponds to frequency $(f_{LO}-f_{IF})$ of a received on-air RF signal, and let the image band correspond to $(f_{LO}+f_{IF})$. Some FM receivers herein can employ low-IF architecture to deal with analog impairments like flicker noise, DC offset and carrier leak-through. Other types of receivers may also be used with or in various embodiments. In the low-IF architecture depicted, the desired signal is first down-converted to an intermediate frequency (IF) in FIG. 1, such as for example an IF less than 500 kHz and at least as great in IF frequency as an odd multiple (at least three times) of half a channel width. One embodiment as in FIGS. 2 and 4 has a low IF with $f_{IF}$=150 KHz. The desired signal is subsequently processed by down-conversion, or de-rotation, 210 in the digital processing 50 followed by channel select filtering CSF on the base-band signal in block 200. FM demodulation and stereo decoding follow afterwards, downstream of block 200.

Notice that actually both a signal channel and an image channel are delivered from RF front-end 20 into the low IF signal chain of FIG. 2. Then down-conversion block 210 executes a down-conversion from the low intermediate frequency $f_{IF}$ down to DC in FIG. 2. Down-conversion block 210 includes a complex digital mixer that can separate the signal and image from each other. That digital mixer frequency-shifts the signal channel band from IF so as to be centered at DC and outputs this (output marked as Signal in FIG. 4). Any component of image at that Signal output is at a substantially higher frequency and filter-rejected in the signal path CSF. Simultaneously, some embodiments of that digital mixer frequency-shift the image band to also be centered at DC but output it from the separate output marked Image from FIG. 4 block 210. In an embodiment utilizing the latter Image output, the Image output is thus separate from the Signal output from block 210, and any component of signal at that Image output is at a substantially different frequency and filter-rejected separately. In this way, separate Signal and Image paths may be provided in some embodiments. See also representative Equations later hereinbelow that express how the down-conversion is accomplished for Signal, as well as providing the two separate Signal and Image outputs if desired.

An embodiment may include frequency-scanning as in the incorporated TI-69599IndiaPS that measures an SQI (Signal Quality Indicator) 285 as a windowed sum-of-squares in the down-converted signal band and measures an IQI (Image Quality Indicator) 275 analogously in the down-converted image band (the band that at RF was 300 KHz higher than the signal band). An embodiment, as in FIG. 4, herein operates by a remarkable mode-switched process during regular reception and for audio sensitivity enhancement herein when receiving a particular signal channel. Such reception may occur subsequent to frequency-scanning, or in any other suitable way or occasion. The embodiment mode-switches the "IQI" process 275 away from the image path, such as by a mux 310, and uses "IQI" 275 instead to remarkably monitor the signal channel strength and with a narrower width filter CSF1, ISF2 (e.g., 50 kHz). (This 50 KHz filtering of signal is narrower than e.g. 100 KHz used for filtering the image during frequency-scan.) The SQI is also used for monitoring the signal channel strength with a wider width filter CSF1, CSF2 (e.g., 100 kHz) than that just-mentioned 50 KHz. The filter path for the signal channel is thus mode-switched into a "Y" shape or fork shape having at least two filter widths. (Another type of embodiment may lack the type of signal/image frequency scanning just noted. On signal reception such embodiment straightforwardly provides the remarkable Y-shaped signal channel filter path, the mux 260, and the signal strength indicators 275, 285. "IQI" 275 used in such embodiment has no connection with an 'image' path, and no image output from down-conversion 210 need be provided.)

In FIGS. 4-6, a type of dynamic filter switching embodiment herein remarkably introduces dynamic switching, such as by a mux 260, of the bandwidths of a Y-shaped channel select filter based on signal conditions during reception of a signal channel. A control module 300, such as a state machine establishes controls to operate mux 260 and other elements in response to measurement inputs as shown. In Mode 1, control module 300 dynamically supplies a selector signal InpSel to mux 260 to perform dynamic switching. Such a control module 300 can be provided in firmware or software to execute on processor 80 of FIG. 2, or module 300 can be provided in hardware.

Figure 9:
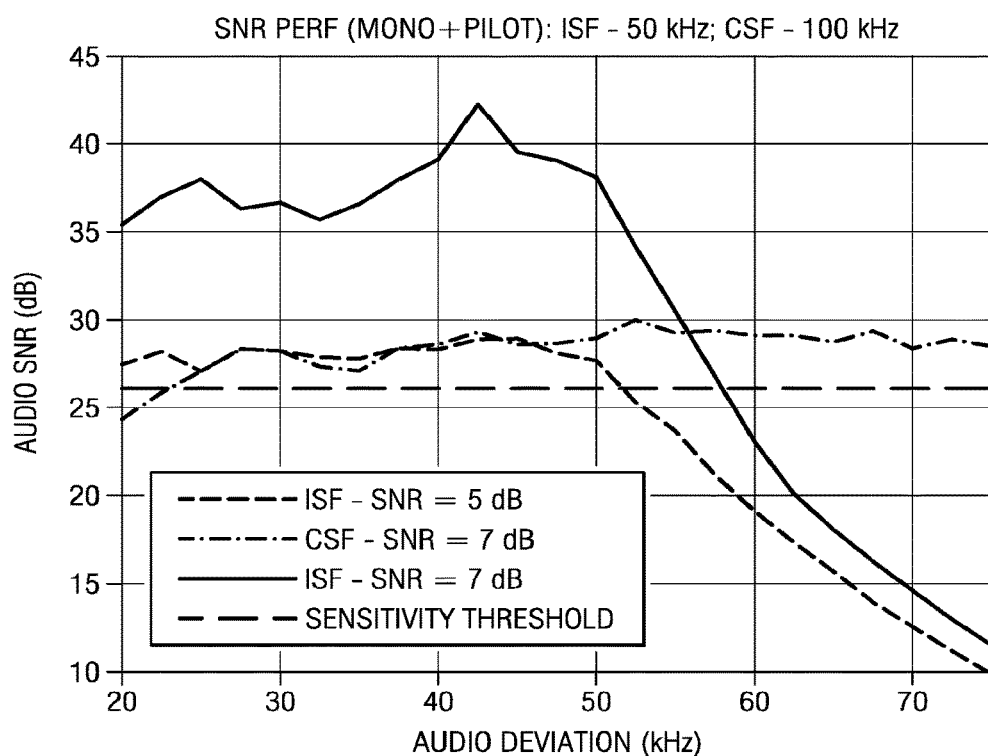
Figure 11:
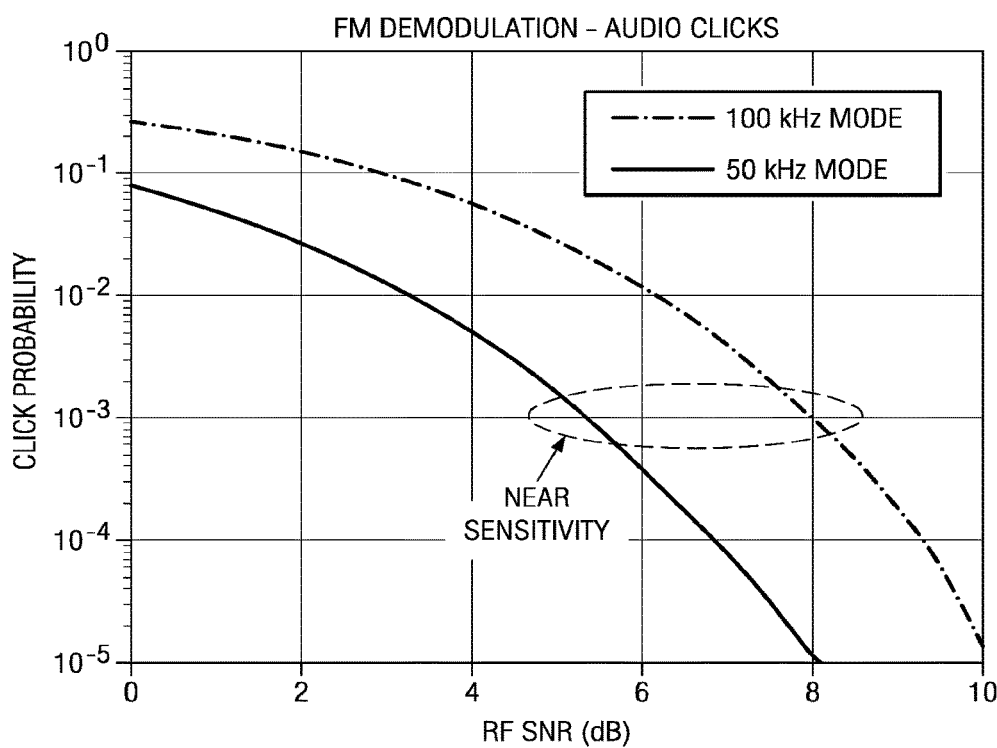

Simulation results support the benefits of doing this dynamic filter switching as in FIGS. 9, 10 and 11. According to this remarkable dynamic filter switching process, attenuation of signal components is prevented by switching to a wider filter bandwidth filter CSF1, CSF2 when occupied bandwidth or frequency deviation of the signal is large, and noise is attenuated relative to signal by switching to a narrower filter bandwidth when the occupied bandwidth is smaller and within the width of the narrow filter CSF1, ISF2. The occupied bandwidth of an FM signal is smaller when the audio modulation is at lower levels for which noise attenuation can confer the most audio sensitivity and audio SNR enhancements. Some embodiments remarkably detect the characteristics of the received signal and dynamically choose the channel select filter bandwidth for coupling to FM demodulator 270. For instance, if a 50 KHz mode and a 100 KHz mode are available, then the lower bandwidth option is used under the following conditions in one example: (1) audio deviation is less than a threshold (Aud_Dev_Thresh), for example ~40 KHz, and (2) the input signal is close to the sensitivity condition, namely the RF SNR is less than a threshold (SNR_Thresh), for example ~13 dB.

The following metrics are used, for example, to determine which of the two channel select filter bandwidth options are selected: 1) Audio deviation estimator (e.g., 295) and/or 2) Signal condition estimator(s) (e.g., 275, 285) and/or Noise estimation (e.g., 290). Dynamic switching of channel select filter bandwidths is performed without glitches or with a very small glitch at the input of the FM demodulator 270 to prevent and obviate audible clicks. See FIG. 11 for beneficial click performance with the use of the 50 KHz filter mode that reduces the probability of audio clicks.

In FIG. 4, a Channel Select Filter CSF 240, 250 (CSF1, CSF2) selects (passes) the signal within the signal band of interest (i.e., single FM channel), after the down-conversion 210 of the low IF signal to DC. Basically, the filter is any suitable type of low pass or other filter (e.g., as in FIG. 7) that selects only the band lying in the filter passband. Blocker signals (e.g., adjacent band, image band, etc) that are present outside of the band of interest are desirably rejected by this filter. In one example, a digital FIR LPF (finite impulse response low-pass filter) is employed with a bandwidth of approximately 100 KHz (real filter with a pass band from 0 KHz to 100 KHz). The filtering is selectively switched by multiplexer circuitry 260, 310 or by software. Audio sensitivity is improved by introducing the 50 kHz filtering mode via CSF1, mux 310, ISF2, and mux 260, while harmonic distortion is kept low by the dynamic switching (muxing 260). Click probability, as in FIG. 11, is maintained at a low level by not adding any additional audio clicks during the dynamic switching between the two filter bandwidths (50 kHz, 100 kHz) because of equalized filter group delays in respective filtering paths. Power consumption is quite acceptable and very little incremental power is consumed by employing the described embodiments herein. Chip real estate is conserved because only a little additional circuitry is used, or a same programmable processor 80 operates with only a little additional software which can readily occupy memory spaces already on hand.

In FIG. 4, some embodiments have an image select filter ISF module 220, 230 (ISF1, ISF2) that isolates the image band. Such module 220, 230 can be useful for use in frequency-scanning beforehand as in the incorporated application TI-69599IndiaPS as discussed earlier hereinabove. In audio-enhanced reception by the embodiment of FIG. 4, the ISF1 220 is suitably disabled for power management, and ISF2 is reconfigured for 50 kHz operation by a control signal Flt_Mode from control block 300. Mode is set to one (1) at mux 310 and establishes a Y-shaped signal filtering path. InpSel is dynamically set to 1 or 0 to respectively couple 50 KHz filtering or 100 kHz filtering via mux 260 to FM demodulator 270. Module 275 is used as a signal measuring module for the 50 KHz narrower bandwidth signal path having CSF1 and the reconfigured ISF2. Given this description, it will also be understood that an alternative type of embodiment can provide a pre-configured 50 KHz filter module and sufficient muxing or mode-driven conditional software instructions to effectively substitute that pre-configured 50 KHz filter module in place of ISF2 between mux 310 and mux 260.

In FIG. 4, a block diagram of the FM receiver digital baseband is thus illustrated. The audio sensitivity of FIG. 1 FM receiver 10 (1720 in FIG. 12) is potentially enhanced by employing information on the instantaneous bandwidth of the FM modulated signal. The bandwidth of the channel select filter CSF is dynamically tightened to reduce the noise level at the input of the FM demodulator 270, and the embodiment not only reduces random noise but also reduces the probability of occurrence of audio clicks. The dynamic filter bandwidth selection is attained with the use of the channel select filter CSF and the image select filter section ISF2.

A special mode (Mode 1) is supported in the ISF2 path to enable the audio sensitivity enhancement. Under this Mode 1, the output of the first stage channel select filter CSF1 240 is Muxed in via a special mux 310 to the input of the second stage ISF2 230. The second stage ISF2 230 in Mode 1 uses or is reconfigured to use a narrow-bandwidth set of coefficients, and this mode is also run in conjunction with the channel select filtering CSF1 240, CSF2 250 on the desired signal. Depending on the signal conditions, the output of either the CSF2 or the ISF2 (Mode 1) is dynamically selected by mux 260 while compensating for the appropriate group delay differential (e.g., 10 samples) to ensure glitch-free switching and avoid any additional audio clicks on switching of mux 260 under control by signal InpSel. The channel select filter path CSF1, CSF2 in one numerical example has a bandwidth of 100 KHz and the channel select filter path CSF1, ISF2 (Mode 1) has a bandwidth of 50 KHz. CSF1, CSF2 in one implementation uses an input sampling rate of 768 kHz, 16-bit input and output bit precisions, signal band of 0-100 kHz and stop band 200-384 kHz with greater than 64 dB mean stop band attenuation that rejects the signal band at +/−300 KHz away.

As noted hereinabove, the ISF second stage 230 is provided with the additional Mode 1 by a multiplexer 310 that enables parallel (wye shape "Y") operation in Mode 1 along with the channel select filter CSF 240, 250. Mode 1 thus provides a lower bandwidth filtering option of the desired signal for audio sensitivity enhancement. Otherwise, in Mode 0, the multiplexer 310 couples the output from ISF stage 220 to the input of ISF stage 230 (Mode 0, 100 KHz), and there is no Mode 1 cross connection or cross coupling operation via multiplexer 310 from CSF stage 240 into ISF stage 230.

TABLE 1 shows a related way of establishing a control register 320 of FIG. 5 to supply control bits connected to parts or modules in FIG. 4.

TABLE 1

CONTROL REGISTER 320 BITS

| Bit Field | Description | Value (Default 0) |
|---|---|---|
| Image_Select_En | Selectively enables image select filter ISF | 0/1 ⇒ Disable/Enable |
| Image_Select_Mode | Selects between conventional (0) and enhanced mode (1). | 0/1 ⇒ Disable/Enable |
| Demod_InputSel | Selector control of Mux 260 | 0/1 ⇒ CSF/ISF Output |
| IQI_En | Selectively enables image quality indicator IQI | 0/1 ⇒ Disable/Enable |

In the FIG. 4 embodiment, significant audio sensitivity enhancement is achieved by InpSel=1 at mux 260 to couple the narrow filter bandwidth, namely the 50 KHz filter, to FM demodulator 270 whenever the bandwidth of the FM modulated signal is lower than 50 KHz. This is the case for an Audio Sensitivity test performed at an audio deviation of 22.5 KHz as in FIG. 10. The amplitude of the audio signal that is used to modulate the FM carrier exhibits high levels of variation over time. Under typical use case scenarios, the occupied bandwidth of the FM transmissions varies in audio deviation above and below 50 KHz. The maximum occupied bandwidth is 75 KHz for FM broadcast signals, but the signal bandwidth is on the order of 10-20 KHz a large percentage of time. Hence, the narrow filter bandwidth (e.g. 50 KHz) dynamically delivered by InpSel=1 in Mode 1 enhances the sensitivity for realistic audio signals.

In FIGS. 4 and 5, a Dynamic Filter Switching embodiment of structure and process embodiment enables and determines when to enable this enhanced audio sensitivity control InpSel=1. Selecting the 50 KHz filter bandwidth provides a performance advantage in FIG. 10 and especially when the RF SNR of the received signal is close to sensitivity, e.g., between 7 dB to 10 dB and the audio deviation is less than 50 KHz. At high values of RF SNR or higher audio deviation, the 100 KHz filter bandwidth is selected by resetting control InpSel=0 at mux 260 according to the process in some of the embodiments. First of all, given variations between lower and higher audio deviations, this process of operation confers desirable THD performance. Moreover, when RF SNR is high, InpSel=0 (100 KHz) is sufficient to deliver desirably high audio SNR regardless of the audio deviation. Indeed, under this particular condition when the RF SNR is continually high, using InpSel=0 regardless of high or low audio deviation avoids InpSel switching 0/1 at mux 260.

In FIG. 5 and/or various TABLES describing alternative pseudocode embodiment versions herein, switching based on input metrics in FIG. 4 to a state machine 300 selectively establishes the filter bandwidth control InpSel. In some of the state machine embodiments, a 100 KHz filter state is designated state S1 (CSF1, CSF2, 260), and a 50 KHz filter state (CSF1, 310, ISF2, 260) is designated state S2. Some other state machine embodiments also have an additional IDLE state that defaults to 100 KHz filtering (CSF1, CSF2, 260).

In a first version of pseudocode, suppose the RF SNR is mostly determined by thermal noise in the analog front-end 20, such as is likely the case in testing the receiver 10 with a signal generator and without an antenna. Then un-quantized SQI is suitably used as a metric by the state machine in FIG. 5 according to pseudocode in TABLE 2 to determine the filter bandwidth state and the appropriate controls. (Double-ampersand symbol '&&' signifies logical AND, double-bar symbol '||' signifies logical OR, and '_m_' signifies minus for subtraction.)

TABLE 2

SQI-BASED CONTROL SWITCHING

```
//To determine the switch to the 50 KHz filter mode:
If (Filt_Mode = 100)
    If {(SQI < SQI_Thresh_Low)&&(Fdev_Est < Fdev_Thresh_Low)}
        Set Filt_Mode = 50.
        Set InpSel=1 // Switch filter mode to 50 KHz
    end
end
//To determine the switch to the 100 KHz filter mode:
If (Flit_Mode = 50)
    If {(SQI > SQI_Thresh_High)
        || ((Fdev_Est > Fdev_Thresh_High)
            || (SQI_m_IQI > EnergyDiff_Thresh)}
        Set Filt_Mode = 100
        Set InpSel=0 // Switch filter mode to 100 KHz)
    end
end
```

Some embodiments as in TABLE 3 use switching based on signals from Noise Meter 290 instead of SQI in some places in the logic. Such revised logic is useful such as when an antenna is coupled to receiver front end 20 and the RF SNR is determined by the noise temperature of the antenna and not preponderantly by the RF front end 20 thermal noise. In this case, the Noise Meter 290 is used as a metric that is sufficiently related to the RF SNR for conditional mode-determination. The logic for selecting the 50 KHz or 100 KHz filter InpSel=1/0 is identical except that Noise Meter replaces SQI as shown in TABLE 3. A configuration circuit responsive to a configuration bit SQI_NOISEMETER in TABLE 9 control register 320 establishes whether which of Noise Meter or SQI is used (e.g., whether TABLE 3 or TABLE 2 pseudocode is used).

TABLE 3

PSEUDOCODE BASED ON NOISE METER

```
//To determine the switch to the 50 KHz filter Mode 1:
If (Filt_Mode = 100)
    If {(NoiseMeter > NoiseMeter_Thresh_High)
        && (Fdev_Est < Fdev_Thresh_Low)}
        Set Filt_Mode = 50.
        Set InpSel=1 // Switch filter mode to 50 KHz
    end
end
//To determine the switch to the 100 KHz filter Mode 0:
If (Flit_Mode = 50)
    If {(NoiseMeter < NoiseMeter_Thresh_Low)
        || ((Fdev_Est > Fdev_Thresh_High)
        ||(SQL_m_IQI > EnergyDiff_Thresh)}
    Set Filt_Mode = 100
        Set InpSel=0 //Switch filter mode to 100 KHz
    end
end
```

Some embodiments handle variations in Noise Meter 290 sample values by setting noise meter output equal to the median of a plurality (e.g., three (3)) noise measurement samples taken during consecutive AGC windows, and saturated to 16 unsigned bits or otherwise as appropriate. Here, pair-wise comparisons between, e.g., the three values are generated and fed as a three-bit digital address to a look-up table LUT in TABLE 4 that outputs the median. The median of samples is obtained another way by sorting them in either ascending or descending order and picking the middle sample from the sorted sequence instead.

TABLE 4

LUT FOR MEDIAN FILTERING

| ($x_1 > x_2$) | ($x_2 > x_3$) | ($x_3 > x_1$) | Output |
|---|---|---|---|
| Yes | No | Yes | x1 |
| No | Yes | No | x1 |
| Yes | Yes | No | x2 |
| No | No | Yes | x2 |
| Yes | No | No | x3 |
| No | Yes | Yes | x3 |
| No | No | No | x1 |

In FIG. 4, an Audio Deviation Estimator 295 generates an audio deviation estimate of the demodulated FM signal to provide the Fdev_Est metric used in the Tables for some embodiments to dynamically determine the filter mode and InpSel=1/0. The Audio Deviation Estimator 295 generates a signal representing an estimated value of audio deviation by electronically computing an output designated LpR_Est as the mean absolute value (or the amplitude or magnitude without regard to sign) of the demodulated FM signal after downstream stereo decoding in FIG. 2. Audio Deviation Estimator 295 in one example provides an envelope detector fed with the absolute sum of the Left and Right audio signal (|L|+|R|). A DC estimation filter based off the monaural channel (L+R) can be used to cancel DC offset out of each channel L and R prior to the absolute sum. For some background, a suitable envelope detector such as fed with (|L|+|R|) as in incorporated patent applications TI-69708 and TI-69708IndiaPS can be used. However, for an audio sensitivity enhancement embodiment here, such envelope detector has its output fed back and remarkably used instead or additionally to compute Audio Deviation estimator Fdev_Est. Estimator Fdev_Est then is fed in FIG. 4 to the state machine 300 as part of a control process embodiment for baseband block 200 for audio sensitivity enhancement. The envelope detector process provides a configured degree of filtering that approximately has an attack time constant with which the filtering more or less slowly responds at the onset of a change in absolute sum signal magnitude (|L|+|R|), and a delay (or release) time constant with which the filtering responds later on. In some embodiments, a DC offset of the FM Demodulator output in FIG. 2 is multiplied by an appropriate scale factor and added to the LpR_Est intermediately in the process of generating the estimator Fdev_Est. A scale factor (Dev_Est_Scale) (e.g., about unity, 1, or otherwise as suitable) is multiplied by LpR_Est (with or without contribution of DC offset of the FM Demodulator output) to output a frequency deviation value Fdev_Est for use by the state machine 300.

Some embodiments include an Excess Bandwidth Detector in control block 300, and such detector is represented by the logic condition SQI_m_IQI>EnergyDiff_Thresh. (See also discussion of FIG. 7 elsewhere herein.) If the bandwidth of the received signal exceeds the bandwidth of the baseband channel select filter CSF1, ISF2 240, 310, 230, then the audio deviation might then be under-estimated by IQI 275, specifically when in the 50 KHz filter bandwidth when the audio deviation of the signal is high. Moreover, the output of the FM demodulator 270 could likely be distorted (if control state InpSel were set to 1 and not appropriately reset to 0). Hence, an additional mechanism is provided to detect the presence of such wider bandwidth signal while using the 50 KHz filter mode and to appropriately deliver control signal InpSel to mux 260. This mechanism measures relative energy level in the received signal beyond the 50 KHz bandwidth. When the filter ISF2 230 is enabled in the 50 KHz mode, the 'IQI' 275 measures the signal strength over a 50 KHz band while the SQI measures the signal strength over the 100 KHz band. If the difference SQI_m_IQI between un-quantized SQI and IQI (e.g., in $\log_2$ domain) exceeds a threshold, then it indicates that the received signal probably has a wider bandwidth than 50 KHz. SQI and IQI in some embodiments are also suitably compensated for AGC gain.

In FIG. 5 and TABLE 5, an embodiment obtains the enhanced audio sensitivity with appropriate power management, especially when the audio deviation is below a pre-defined threshold and RF SNR is low. The filter bandwidth is switched from 100 KHz bandwidth InpSel=0 to 50 KHz bandwidth InpSel=1, whereupon state machine state S2 is reached. An example for state machine 300 controls dynamic filter switching as described in pseudocode in TABLE 5. Fdev_Est, SQI, IQI and Noise Meter are various metrics responsively used by state machine 300 to switch between filter bandwidths, with appropriate hysteresis. State machine 300 executes periodically (e.g., every 8 msec). Suggested values of parameters for noise thresholds Noise_Th1, Noise_Th2; frequency deviations Fdev_Th1, Fdev_Th2; and an energy difference threshold EnergyDiff_Th are indicated by annotations (*, #, &).

TABLE 5

PSEUDOCODE FOR A CONTROL SEQUENCE EMBODIMENT

```
// Switch to Filt Mode of 100 KHz at mid and high signal strengths:
   if (Noise_Meter < Noise_Th1*)
      if (Filt_Mode = 50)
         Set Filt_Mode = 100
         Disable ISF, IQI hardware modules
      end
   end
* Noise_Th1: Nominally use a Noise Meter value corresponding to an RF SNR of 16 dB
// Switch to Filt_Mode of 50 KHz at low signal strengths based on signal bandwidth:
   if (Noise_Meter > Noise_Th2*)
      if (Filt_Mode = 100)
         if (Fdev_Est < Fdev_Th1#)
            Enable ISF, IQI hardware modules
            Set Filt_Mode = 50
         end
      end
      if (Filt_Mode = 50)
         if ((Fdev_Est > Fdev_Th2#) || (SQI-IQI > EnergyDiff_Th&))
```

TABLE 5-continued

PSEUDOCODE FOR A CONTROL SEQUENCE EMBODIMENT

```
                Set Filt_Mode = 100
                Disable ISI, IQI hardware modules
            end
        end
    end
* Noise_Th2 Nominally use a Noise Meter value corresponding to an RF SNR of 13 dB
# Nominally use a Fdev_Th1 of 35 KHz and Fdev_Th2 of 40 KHz
& Nominally use a EnergyDiff_Th of 2 dB
```

TABLE 6 shows pseudocode specifically patterned after the three states of state machine 300 in audio sensitivity enhancement Mode=1 and their particular state transition legends of FIG. 5. Lower noise meter means higher RF SNR, all else equal, so TABLE 6 thresholding on noise meter uses less-than "<" in opposite to RF SNR. Also, transitions between Mode=1 for audio sensitivity enhancement in station reception and Mode=0 such as for frequency scanning FREQ_SCAN are shown in FIG. 5 and TABLE 6. A START state mediates the transitions. The various Tables show that a variety of process and structure embodiments can be alternatively provided.

The TABLE 6 pseudocode is abbreviated regarding periodic timer controls to briefly activate and execute the state machine (e.g., every 8 msec) to update its state. Also implicit are conditional Mode=0 transitions out of audio sensitivity enhancement state machine back to START.

TABLE 6

PSEUDOCODE FOR MULTIPLE-STATE CONTROL EMBODIMENT

```
START: Set Mode = 0 // Mux 310
    Input (Mode)
    IF (Mode =0) && SEEK = 1
        Set IQI_En =1 //Enable IQI module
        Set Image_Select_En = 1 // Enable ISF module
        Set Filt_Mode = 100
        Goto FREQ_SCAN
MODE1: ELSE IF (Mode=1)
        Set IQI_En =0 //Disable IQI module
        Set InpSel =0 //Mux 260: 100 KHz
        Set Image_Select_En = 0 //Disable ISF module
        Set Filt_Mode = 100
        Goto IDLE
        end
    Goto START
    end
FREQ_SCAN:
    IF (Mode =0) && SEEK = 1
        <Execute Frequency Scanning>
        Scan_end=1
        Mode=1
        Goto MODE1
    ELSE Goto START
    end
// Switch to Filt Mode of 100 KHz at medium and high signal strengths.
S2: IF (Noise_Meter < Noise_Th1*) && (Filt_Mode = 50)
        Set IQI_En =0 //Disable IQI module
        Set InpSel =0 //Mux 260: 100 KHz
        Set Image_Select_En = 0 //Disable ISF module
        Set Filt_Mode = 100
        Goto IDLE
    ELSE IF (Filt_Mode = 50) &&
        ((Fdev_Est > Fdev_Th2#) || (SQI-IQI > EnergyDiff_Th&))
        Set IQI_En =0 //Disable IQI module
        Set InpSel =0 //Mux 260: 100 KHz
        Set Image_Select_En = 0 // Disable ISF module
        Set Filt Mode = 100
        Goto S1
        end
    Goto S2
    end
* Noise_Th1: Nominally use a low Noise Meter value corresponding to RF SNR 16 dB
& Nominally use a EnergyDiff_Th of 2 dB
// Switch to Filt_Mode of 50 KHz at low signal strengths based on signal bandwidth
S1: IF (Noise_Meter < Noise_Th1*) && (Filt_Mode = 100)
        Set IQI_En =0 //Disable IQI module
        Set InpSel =0 //Mux 260: 100 KHz
        Set Image_Select_En = 0 // Disable ISF module
        Set Filt_Mode = 100
        Goto IDLE
    ELSE IF (Noise_Meter > Noise_Th2* && (Fdev_Est < Fdev_Th1#)
```

TABLE 6-continued

PSEUDOCODE FOR MULTIPLE-STATE CONTROL EMBODIMENT

```
    Set Image_Select_En = 1 // Enable ISF2 module
    Set Filt_Mode = 50
    Wait ~100 usec
    Set InpSel = 1          //Mux 260 50 KHz
    Set IQI En =1 //Enable IQI module
    Goto S2
   end
  Goto S1
  end
IDLE: IF (Noise_Meter > Noise_Th2*)
    Set IQI_En =0 //Disable IQI module
    Set InpSel =0  //Mux 260: 100 KHz
    Set Image_Select_En = 0 // Disable ISF module
    Set Filt Mode = 100
    Goto S1
  ELSE Goto IDLE
  end
```
* Noise_Th2 Nominally use a higher Noise Meter value corresponding to RF SNR 13 dB
Nominally use Fdev_Th1 = 35 KHz and Fdev_Th2 = 40 KHz Some alternative embodiments can provide a different kind of state machine 300 of FIG. 4 to address any in-between cases or corner cases that may come to light. Some state machine alternatives may rearrange or vary the usage of some of the conditions in the pseudocode of TABLES 2, 3, 5 or 6. Hysteresis is suitably used to avoid excessive state machine switching, e.g., by placing Noise_Th1 less than Noise_Th2, apart in value.

Implementing an embodiment is appealingly low in electronic computational complexity and chip real estate. An Image Select Filter (ISF2) module used in the fast-scan of the incorporated patent application TI-69599 is suitably reconfigured and re-used for the parallel filter chain CSF1, ISF2 with the lower signal bandwidth (50 KHz). Incremental complexity involves (a) support of a second set of filter coefficients for ISF2, (b) delay element at one of the filter outputs to mux 260 to ensure that both the 50 KHz and 100 KHz filter paths have the same group delay, and (c) the additional MUXes 310, 260 themselves.

Figure 5A:
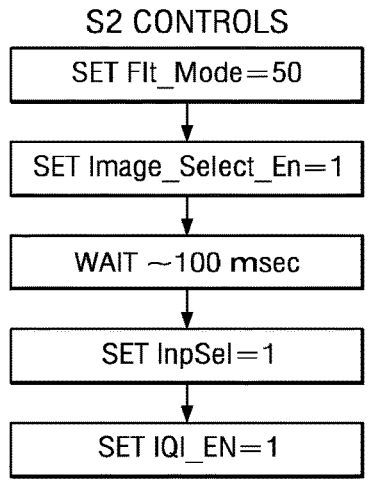
FIG. 5A, FIG. 5B, and FIG. 5C are process flow diagrams detailing operations at different states in a state transition diagram of FIG. 5.

In FIG. 5A, upon reaching the state S2 of FIG. 5, one process embodiment provides the following state S2 control steps of TABLE 7:

TABLE 7

STATE S2 CONTROL STEPS

| | |
|---|---|
| 1. | Set Flt_Mode = 50 to put filter ISF2 into 50 KHz mode. |
| 2. | Set Image Select En = 1 to enable the image select filter ISF2. |
| 3. | Wait for the image select filter ISF transients to die down (e.g., >~100 usec). |
| 4. | Set TABLE 1 InpSel = 1 to cause Mux 260 to switch the 50 KHz filter to the FM demodulator 270 input. |
| 5. | Set IQI_EN = 1 to enable the IQI block 275. |

When the input signal strength is substantially higher than sensitivity or if the audio deviation is above a pre-defined threshold in Mode 1, the filter bandwidth Flt_Mode and dynamic control signal InpSel are switched from 50 KHz state S2 to 100 KHz state S1. Additionally, during a new tune (Preset, SEEK or Alternative Frequency AF), a switch occurs to the 100 KHz filter Mode=0.

Figure 5B:
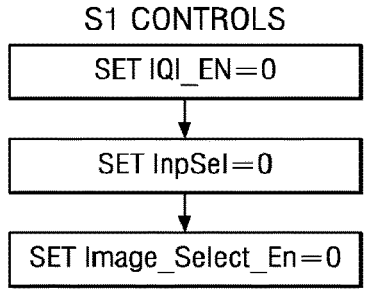
Figure 5C:
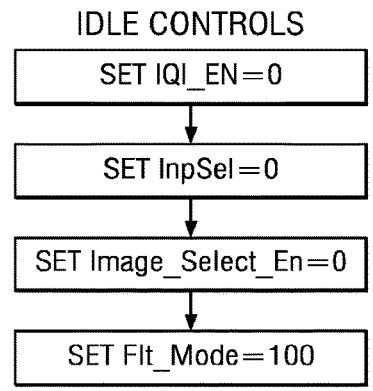

In FIG. 5B, the following steps of TABLE 8 are followed upon reaching state S1 or upon reaching the IDLE state. These steps are executed to switch the filter mode and dynamic control signal InpSel from 50 KHz bandwidth at state S2 to 100 KHz bandwidth at state S1 or IDLE state.

TABLE 8

STATE S1/IDLE CONTROL STEPS

| | |
|---|---|
| 1. | Set IQI_EN = 0 to disable the IQI block 275. |
| 2. | Set TABLE 1 InpSel = 0 to cause Mux 260 to switch the 100 KHz filter CSF2 to the FM demodulator 270 input. |
| 3. | Set Image Select En = 0 to disable the image select filter ISF. In the S1 state, the filter section ISF2 is configured in Flt_Mode = 50 in case of a return to state S2. |
| 4. | In the IDLE state, Flt_Mode in the ISF2 path can be reset to 100 KHz. (optional) |

In TABLE 1 and TABLE 9, bits or bit fields for control register 320 support the operations of the state machine of FIG. 5. In TABLE 9, these register 320 bit fields are mostly for storing threshold parameters for decision steps indicated in the pseudocode, as well as a scale parameter to help obtain the frequency deviation estimate. Noise Meter value represents a currently-measured noise value. A selector bit SQI_NOISEMETER establishes which one of SQI or Noise Meter value is used in the logic as described elsewhere herein for TABLES 2 and 3.

TABLE 9

REGISTER LIST

| Field Name | Description |
|---|---|
| NOISEMETER_VALUE | Noise_Meter value |
| SQI_NOISEMETER | Select 0/1 between SQI or Noise Meter for the Audio Sensitivity Enhancement (TABLES 2, 3) |
| SQI_THRESH_HIGH | SQI threshold above which the 100 KHz filter is selected, e.g., default value 11 dB µV. (TABLE 2) |

TABLE 9-continued

REGISTER LIST

| Field Name | Description |
| --- | --- |
| SQI_THRESH_LOW | SQI threshold below which the 50 KHz filter may be selected, e.g., default value 8 dB μV. (TABLE 2) |
| ENERGYDIFF_TH | (SQI - IQI) difference threshold above which the 100 KHz filter mode is selected, e.g., default value 1.5 dB μV. |
| FDEV_THRESH_HIGH | Audio Deviation value above which the 100 KHz filter is selected, e.g., default value 45 KHz. (Fdev Th2) |
| FDEV_THRESH_LOW | Audio Deviation value below which the 50 KHz filter mode is selected, e.g., default value 35 KHz. (Fdev Th1) |
| NOISEMETER_THRESH_HIGH (Noise Th2) | Noise Meter value above which the 50 KHz filter may be selected, e.g., equivalent of 40.5 dB Audio SNR. |
| NOISEMETER_THRESH_LOW (Noise_Th1) | Noise Meter value below which the 100 KHz filter is selected, e.g., equivalent of 43.5 dB Audio SNR. |
| FDEV_EST_SCALE | Scale factor to convert input LpR Energy to frequency deviation estimate. |

In FIGS. 4, 5 and 6, The image select filter ISF modules ISF1 and ISF2 work together in cascade, such as in a Scan or Seek mode (Mode=0 at mux 310) to isolate the image band and suppress the signal band from the ISF path. Such type of mode such as for Scan or Seek is called a pre-reception mode herein. The image blocker signal strength value is electronically generated by image quality indicator module IQI 275 in Mode=0. In Mode=1 audio sensitivity enhancement mode, IQI 275 is a 50 KHz Signal (not image) strength indicator which is enabled or disabled by the state machine 300 to aid the deployment of low power mode of intelligent power management. The incorporated patent application TI-69599 India PS explains how the frequency scan mode uses both the CSF and ISF paths in parallel or concurrently. Monitoring of the image output from down conversion block 210 is not needed during user listening to audio from the broadcast station. To improve audio sensitivity for user listening, Module ISF2 from the ISF path is reconfigured (Mode=1 at mux 310, Flt_Mode=50, InpSel=1 at mux 260) as further discussed next.

FIGS. 4 and 6 further show how the special additional mode (Mode 1) is supported intermediately in the filter ISF2 path to enable the audio sensitivity enhancement. The output designated Signal from down conversion block 210 can feed either or both of two filtering paths during user listening. Notice that in Mode 1, CSF1 240 has its output coupled both to ISF2 230 and CSF2 250. In this Mode 1, the output of the first stage channel select filter CSF1 240 is Muxed in to the input of the second stage image select filter ISF2 230 by mux 310 in the mux unit of FIG. 2. Together, CSF1 240 and ISF2 230 deliver a 50 KHz filtered Signal output to a first input of mux 260. The second stage filter ISF2 230 uses a narrower-bandwidth set of co-efficients for 50 KHz Signal filtering with CSF1 240 in Mode 1 than when used for 100 KHz image filtering with ISF1 220 in Mode 0. Together, CSF1 240 and CSF2 250 deliver a 100 KHz filtered Signal output to a second input of mux 260. This audio sensitivity enhancement Mode 1 is run selectively and dynamically under control of InpSel at mux 260 to effectively and selectively establish the narrowness of channel select filtering of the desired Signal, and mux 260 couples that appropriate-width filtered Signal channel to FM demodulator 270. The output of mux 260 is FM demodulated by block 270 in FIG. 6 and stereo decoded downstream in FIG. 2 to provide stereo outputs for users' listening enjoyment, enhanced for increased audio sensitivity and audio SNR as thus described herein. Depending on the signal conditions, the output of either the channel select filter CSF1, CSF2 (Mode=1, Inp-Sel=0) or the audio enhancement via CSF1, ISF2 (Mode=1, InpSel=1) is selected for FM demodulation 270. ISF2 or CSF2 is arranged to provide, equalize or compensate for the appropriate group delay differential (e.g., 10 samples) so that the group delay of CSF1, CSF2 (100 KHz) is the same as the group delay of CSF1, ISF2 (50 KHz). Such delay equalization ensures glitch-free switching and avoid any additional audio clicks on switching of mux 260 in FIG. 4.

In one type of power management embodiment herein, the enablement of the various blocks is as tabulated in TABLES 10A, 10B and 10C. Embodiments and states of operation may vary in other power management processes. TABLES 2, 3, 5, 6 also describe power management processes.

TABLE 10A

POWER MANAGEMENT OF BASEBAN BLOCK 200
(Mode = 1, (InpSel = 1)

| Block | Disable/Enable 0/1 | Selection state |
| --- | --- | --- |
| 220 ISF1 | 0 | |
| 230 ISF2 | 1 | 50 KHz |
| 240 CSF1 | 1 | |
| 250 CSF2 | 1 | 100 KHz |
| 260 Mux | 1 | ISF2 to 270; InpSel = 1 |
| 270 Demod | 1 | |
| 275 IQI | 1 | |
| 285 SQI | 1 | |
| 290 Noise Meter | 1 | |
| 295 Audio Deviation | 1 | |
| 300 State Machine | 1 | |
| 310 Mux | 1 | Mode 1 |

TABLE 10B

POWER MANAGEMENT OF BASEBAND BLOCK 200
(Mode = 1, (InpSel = 0)

| Block | Disable/Enable 0/1 | Selection state |
| --- | --- | --- |
| 220 ISF1 | 0 | |
| 230 ISF2 | 0 | 50 KHz |
| 240 CSF1 | 1 | |
| 250 CSF2 | 1 | 100 KHz |
| 260 Mux | 1 | CSF2 to 270; InpSel = 0 |
| 270 Demod | 1 | |
| 275 IQI | 0 | |
| 285 SQI | 1 | |
| 290 Noise Meter | 1 | |

TABLE 10B-continued

POWER MANAGEMENT OF BASEBAND BLOCK 200
(Mode = 1, (InpSel = 0)

| Block | Disable/Enable 0/1 | Selection state |
|---|---|---|
| 295 Audio Deviation | 1 | |
| 300 State Machine | 1 | |
| 310 Mux | 1 | Mode 1 |

TABLE 10C

POWER MANAGEMENT OF BASEBAND BLOCK 200, MODE 0

| Block | Disable/Enable 0/1 | Selection state |
|---|---|---|
| 220 ISF1 | 1 | |
| 230 ISF2 | 1 | 100 KHz |
| 240 CSF1 | 1 | |
| 250 CSF2 | 1 | 100 KHz |
| 260 Mux | 1 | Freq Scan Process Controls |
| 270 Demod | 1 | |
| 275 IQI | 1 | |
| 285 SQI | 1 | |
| 290 Noise Meter | 0/1 | Freq Scan Process Controls |
| 295 Audio Deviation | 0 | |
| 300 State Machine | 0 | IDLE state |
| 310 Mux | 0 | Mode 0. ISF1 to ISF2. |

In FIG. 6, among various possible implementations, and without limitation, an example of FIR LPF uses a two stage filter that performs decimation by a factor of 2. Output from the digital down conversion block 210 in FIG. 2 and FIG. 4 arrives at a sample rate of 768 kHz for filtering. A first stage (e.g., CSF1) of the filter decimates by two, thereby delivering an intermediate output at 384 kHz (kilosamples per second kSps).

Figure 6A:
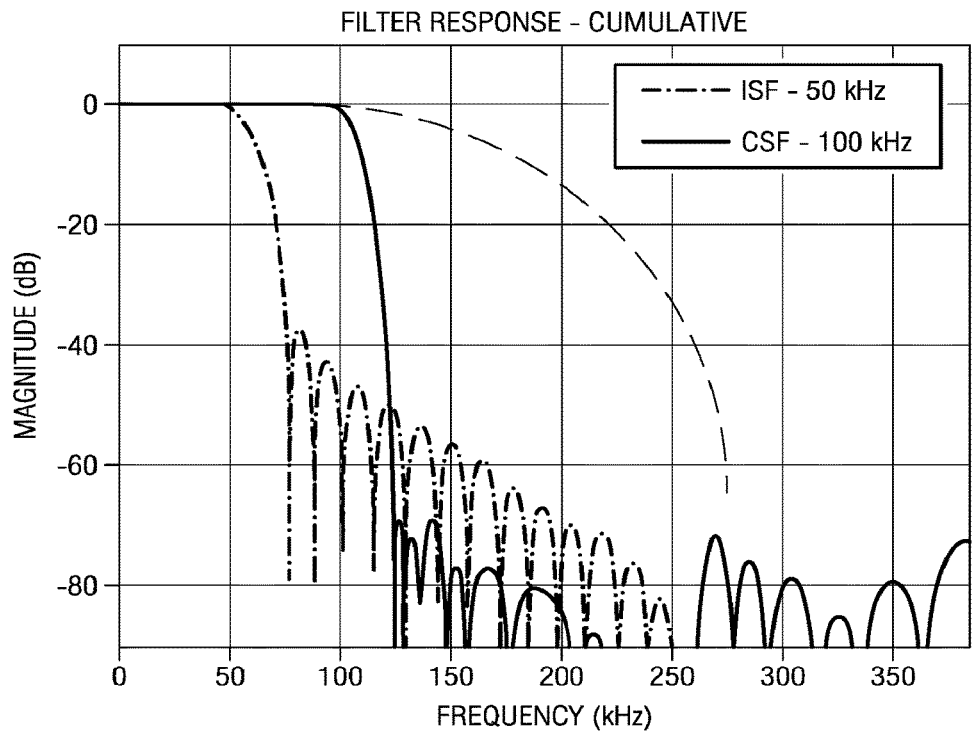

In FIG. 6A, this first stage of FIG. 6 has a filter response as shown by the curve that rolls off between about 150 and 250 kHz. A second stage of the filter of FIG. 6 has 25 taps and delivers an overall filter output at 384 kHz (kSps). In FIG. 6A this second stage, when configured for 100 kHz operation, rolls off between 100 and 150 kHz. Overall, the two-stage filter delivers a low pass filter characteristic that rolls off fairly steeply at about 100 kHz and thereby nicely encompasses a particular channel to be captured by the filter. CSF2 and ISF2 in one implementation uses an input sampling rate of 768 kHz, 16-bit input and output bit precisions, signal band of 0-100 kHz and stop band 200-384 kHz with greater than 64 dB mean stop band attenuation that rejects the band at +/−300 KHz away.

In FIG. 6, a lower bandwidth filter is provided by reusing the second stage of the image select filter and adding an Flt_Mode=50 KHz bandwidth mode. The output of the Stage 1 channel select filter CSF1 is fed not only to the second stage of the channel select filter (CSF2) but also into a reconfigured second stage of the image select filter (ISF2). In FIG. 6A, a leftmost filter response curve shows steep rolloff starting at 50 KHz for the CSF2, ISF2 filter path. The ISF2 output is delayed to ensure that the group delay of both the CSF and ISF paths are the same. This enables substantially glitch-free dynamic switching between the two filter modes as the State machine 300 makes some of its transitions. The output of the ISF2 (50 KHz) and CSF2 (100 KHz) of FIG. 4 are muxed by mux 260 into the FM demodulator 270.

In FIG. 6, the second filter stage is a multi-tap symmetric filter with its coefficients. An additional 50 KHz mode has been added for the image select filter second stage ISF2 to enable parallel operation of ISF2 along with the channel select filter CSF2. In this way, a lower bandwidth filtering option of the desired signal for audio sensitivity enhancement is provided.

In some embodiments, software executing in Mode=1 on processor 80 of FIG. 2 virtualizes state machine 300 and other blocks and enables the image select filter ISF2 periodically, and estimates the 50 KHz filtered Signal output strength by using IQI module 275. Once the IQI value is estimated, the filter ISF2 is disabled to save power consumption.

In FIG. 6A, the cumulative response of the image select filter (Mode 0) is shown. Each first stage filter ISF1, CSF1 suitably has a roll off between about 150-250 KHz and then is followed by ISF2, CSF2 to deliver a 100 KHz LPF composite filter output in Mode 0. In Mode 1, ISF2 is reconfigured to deliver a 50 KHz LPF composite filter output, and the group delay is equalized as between ISF2, CSF2.

If the difference (SQI-IQI) in the CSF2 and ISF2 filter output signal strengths exceeds a threshold EnergyDiff_ Thresh, then FM demodulation 270 is executed on the output of the 100 KHz filter CSF2 by appropriately switching mux 260 to connect with CSF2. This metric (SQI-IQI) is used in conjunction with the audio deviation estimator block 295 enabled, see pseudocode for state machine 300.

Figure 7:
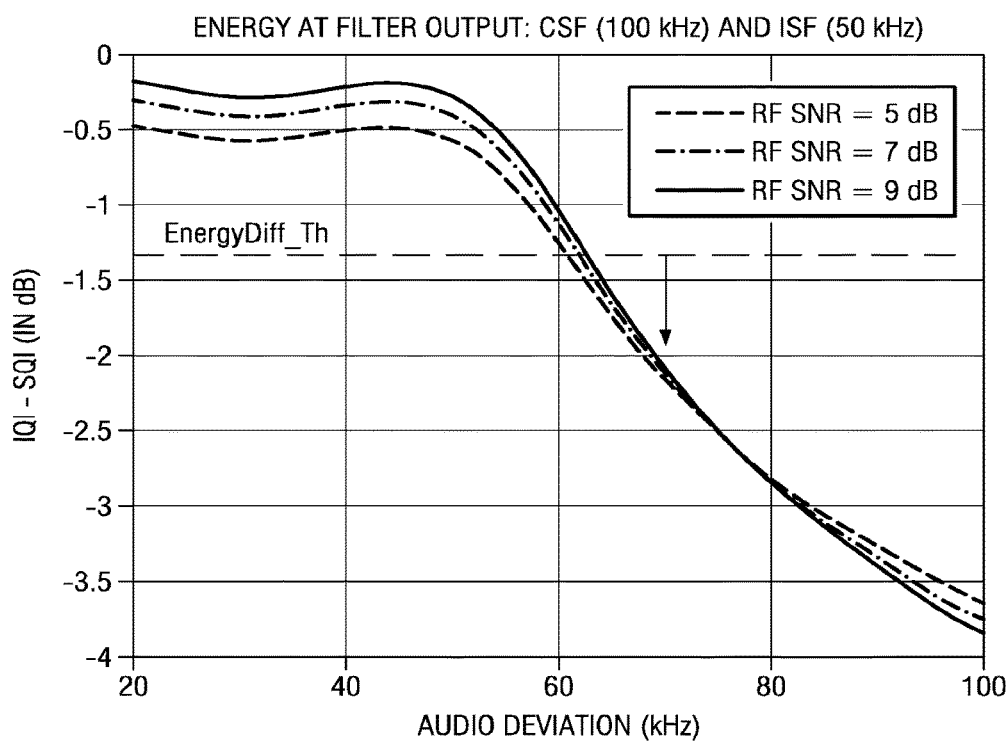

In FIG. 7, the difference (SQI-IQI) between the Signal strengths at the output of the 50 KHz (IQI) and 100 KHz (SQI) bandwidth filters is illustrated. RF SNR is a parameter for the curves, and desirably does not vary them much. The non-monotonicity in the difference between SQI and IQI for lower frequency deviations is believed to be caused by different ripple characteristic between the two filters (CSF1, CSF2) and (CSF1, ISF2). Audio frequency deviations substantially exceeding the 50 KHz filter bandwidth are reliably detected by using a TABLE 9 EnergyDiff_Thresh value of about 1.0-2.5 dB for use by state machine 300 to compare with the difference SQI_m_IQI (i.e., SQI-IQI).

Figure 8:
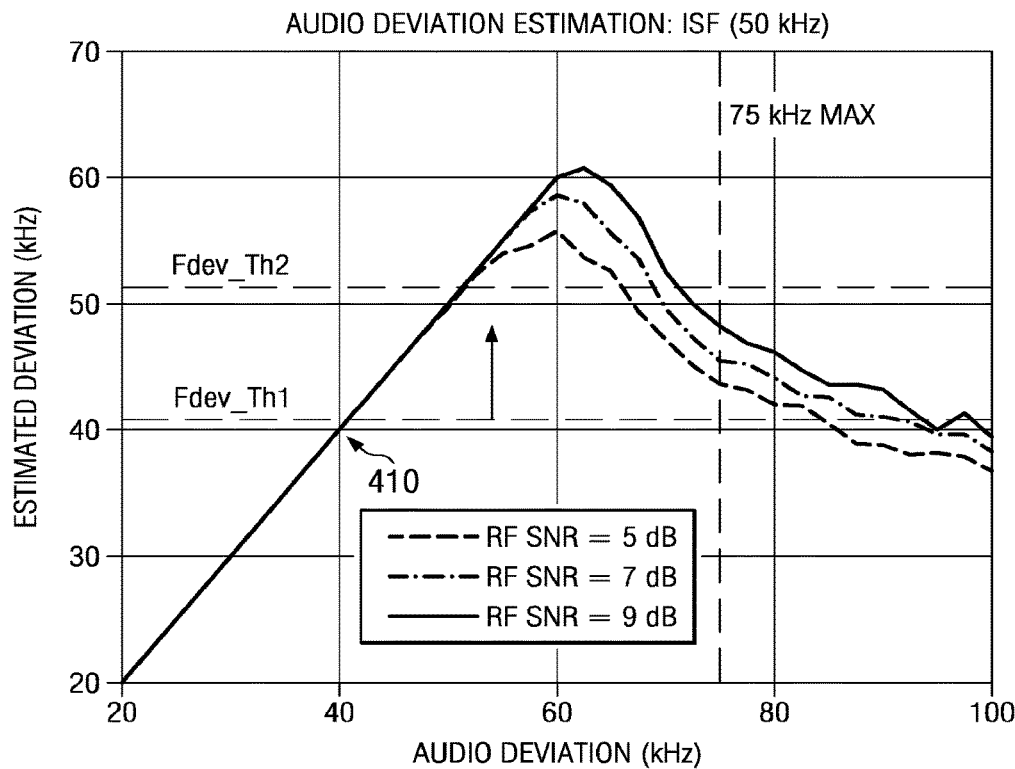

In FIG. 8, an embodiment of an Audio Deviation Estimator block 295 estimates the audio deviation (on vertical axis in FIG. 8) for the demodulated MPX signal by computing an average value of the |L|+|R| stereo decoded signals. The estimated audio deviation is a fairly accurate reflection—at least up to about 50-60 KHz—of actual audio deviation, frequency deviation or FM signal bandwidth (on horizontal axis). RF SNR is a parameter for these curves of FIG. 8, and desirably does not vary them much. The audio deviation estimator is more widely accurate and relatively linear up to about 100 KHz when filter path (CSF1, CSF2) is used because it has 100 KHz width. The linearity, as shown in FIG. 8, extends less widely when 50 KHz Signal filter path (CSF1, ISF2) is used. The estimated audio deviation metric is desirably supplemented or otherwise handled for deviations exceeding 60 KHz when using ISF2 (50 KHz mode).

In FIG. 8 notice a declining right-half portion of the graph of estimated deviation data versus actual audio deviation. Consider an approximately equal amount of RF energy in the FM broadcast signal as a whole regardless of its frequency deviation. Then the portion of the FM signal energy that occupies 0-50 KHz declines as the actual audio deviation in kilohertz is increased beyond 50 KHz. Without more, the audio deviation estimator of FIG. 8 could underestimate the actual frequency deviation (audio deviation) when the signal bandwidth exceeds the channel select filter CSF1, ISF2 50 KHz bandwidth.

Consider FIG. 8 reversed and re-oriented with actual audio deviation on the vertical axis and the estimated deviation on the horizontal axis instead. The hereinabove-noted declining right-half portion of the estimated data versus actual audio deviation leads to a double-valued function of actual audio deviation versus estimated deviation in the re-oriented FIG. 8. As indicated by the dashed line 410, an actual audio frequency deviation above about 60 KHz has a value of estimated audio deviation equal to that of some actual audio frequency deviation below about 60 KHz. Accordingly, a band of ambiguity may exist when attempting to infer or generate a value of actual audio deviation from a (measured) estimated audio deviation value that lies in a range between about 40 kHz and 60 kHz of estimated deviation.

As discussed in the previous two paragraphs, if the estimated frequency deviation is generated from 50 KHz filtered mono (L+R) signal or something like it, it might not be a perfectly true indicator of FM signal bandwidth. Accordingly and additionally, some of the embodiments electronically derive and utilize the difference in signal strength (SQI-IQI) at the output of the 50 KHz ISF2 and the 100 KHz CSF2. Both ISF2 and CSF2 are enabled and used in the process of obtaining this difference (SQI-IQI) for dynamic filter switching. A larger difference (SQI-IQI) indicates signal energy outside the bandwidth of the 50 KHz filter that includes ISF2. State machine 300 of FIG. 4 in such embodiments suitably utilizes this difference (SQI-IQI), see also applicable pseudocode herein. Obtaining the SQI and IQI measurements involves or calls for enabled parallel operation of the 100 KHz CSF2 with the 50 KHz ISF2 in 50 KHz Mode 1, which involves a small, acceptable current consumption compared to disabling CSF2 in 50 KHz Mode 1.

Note that in TABLE 6 the condition (Fdev_Est<Fdev_Th1) for transition from state S1 to S2 is not accompanied by a difference criterion involving (SQI-IQI) if the threshold Fdev_Th1 is set low enough that no FIG. 8 ambiguity arises in determining actual audio deviation from estimated audio deviation. Given a maximum audio deviation of 75 kHz in FIG. 8, no ambiguity arises when using threshold Fdev_Th1 as shown. However, some embodiments for good measure may optionally include that difference criterion involving (SQI-IQI) for triggering the transition S1-to-S2. On the opposite transition from state S2 to S1, the higher threshold Fdev_Th2 does involve potential ambiguity, and so it is desirably accompanied by the FIG. 7 conditional [ . . . ||(SQI-IQI>EnergyDiff_Th&)] in the pseudocode of TABLE 6.

An alternative embodiment can include the conditional determination on difference [(SQI-IQI>EnergyDiff_Th)] of FIG. 7 for determining both transitions S1-to-S2 and S2-to-S1; and such alternative embodiment omits the conditional (Fdev_Est<Fdev_Th1) from both. Notice in that alternative that the 50 kHz filter ISF2 240 and IQI 275 are kept activated in state S1, and such alternative can be useful if such activation is not an energy consumption issue.

Another type of alternative embodiment can provide a different kind of audio deviation estimator for actual audio deviations exceeding about 60 KHz when ISF2 is activated in Mode 1 for 50 KHz bandwidth. In such embodiments, the estimated audio deviation is derived in response to the output of the 100 kHz filter CSF2 while ISF2 is active in the 50 kHz Mode 1. Such embodiments may provide some simplified parallel FM demodulator process block 270' besides that of block 270 and may have some additional muxing at the input of Audio Deviation block 295 depending on embodiment.

In FIG. 9, simulation results show impact of audio deviation on audio SNR. The audio SNR performance is compared for the two filter bandwidths 100 KHz, 50 KHz as the audio frequency deviation is varied. As the audio deviation increases, the bandwidth of the FM modulated signal also increases. The 100 KHz filter provides relatively uniform audio SNR across 75 KHz of actual audio deviation, with some decline below abut 25 KHz. By contrast, the 50 KHz bandwidth filter improves audio SNR by 10 dB or more compared to the 100 KHz filter path at same RF SNR in FIG. 9 and for audio frequency deviations below about 55 KHz. Then audio SNR performance for the 50 KHz filter path declines rapidly as the audio frequency deviation exceeds 60 KHz and the 100 KHz filter path outperforms in the higher audio frequency deviation range. Accordingly, the embodiment of FIGS. 4 and 6 gets the 'best of both worlds' as it dynamically switches mux 260 so that the 50 KHz bandwidth filter path (CSF1, CSF2) is fed to FM demodulator 270 at lower audio frequency deviations and the 100 KHz filter path (CSF1, ISF2) is used for FM demodulation at higher audio frequency deviations. Audio SNR is dramatically increased at the lower deviations (softer audio levels) where it matters the most to the listener.

It should be understood that some other embodiments can configure the coefficients for CSF1 and ISF2 to establish the Mode 1 filter bandwidth at somewhat more or less than 50 KHz, such as in a range 40-60 kHz. Moreover, still other embodiments can introduce one or more additional filter paths so as to piecewise process the different ranges of audio deviation. Accordingly, a further embodiment suitably provides three filter paths for dynamically selected LPF operations having 35 KHz, 55 KHz and 100 KHz instead of 50 KHz and 100 KHz. In choosing an appropriate embodiment from among the various possibilities, the skilled worker suitably considers and compares factors such as audio SNR improvement (FIG. 9), audio sensitivity improvement (FIG. 10), reliability and measurement disambiguation (FIGS. 7 and 8), computational simplicity (FIG. 5), filter switching click probabilities (FIG. 11), relative power consumption, and chip real estate.

In FIG. 10, audio SNR (vertical axis) is advantageously higher in the 50 KHz (Mode 1) than with the 100 KHz (Mode 0), especially at lower RF SNRs below 10 dB for which the improvement in audio SNR is the most important. Thus, FIG. 10 illustrates improved audio sensitivity of about 2 dB resulting from use of an embodiment, and see also the FIG. 10 description earlier hereinabove. This means the user can then hear farther-away stations, and can hear stations better generally, thus enhancing the user experience.

Also in FIG. 10, the noise in the demodulated MPX signal or Audio SNR has a good correlation with the RF SNR of the received signal. Accordingly, a signal condition estimator for RF SNR is economically derived from the audio SNR in some embodiments. A threshold is suitably specified for comparison with audio SNR in such signal condition estimator. The signal condition estimator provides an indication of the RF SNR. In such type of embodiment, 100 KHz filter mode is dynamically switched in by control signal InpSel of mux 260 when RF SNR exceeds a threshold (SNR_Thresh).

Turning to the subject of RDS, for some RDS/RBDS background see U.S. Patent Application Publication 20100232548 dated Sep. 16, 2010, "Demodulation and Decoding for Frequency Modulation (FM) Receivers with Radio Data System (RDS) or Radio Broadcast Data System (RBDS)" (TI-67786), which is hereby incorporated herein by reference.

In FIGS. 4-6, dynamic adjustment of filter bandwidth maintains RDS performance herein in such embodiments. The embodiment can prevent potential degradation of the receiver sensitivity to the RDS signal by 2 to 4 dB noted in TABLE 11 (audio deviation assumed 22.5 KHz). Dynamically increasing the filter bandwidth to 100 KHz in moments or intervals of larger audio deviations preserves RDS signal herein. And when audio deviation is lower, decreasing the filter bandwidth (e.g., back to 50 KHz) improves audio sensitivity and audio SNR when they matter most.

In TABLE 11, simulation results for RDS sensitivity performance are tabulated for RDS deviations of 2 KHz and 1.2 KHz. The audio deviation during the RDS sensitivity test is set to 22.5 KHz. TABLE 11 tabulates values of minimum RF SNR for RDS performance for channel select filter CSF bandwidth of 100 KHz and 50 KHz.

TABLE 11

RF SNR FOR RDS PERFORMANCE

| Desired RF SNR | Filter Bandwidth of 100 KHz | Filter Bandwidth of 50 KHz | Loss due to 50 KHz Bandwidth |
|---|---|---|---|
| RDS Deviation = 2 KHz | 16 dB | 18 dB | 2 dB |
| RDS Deviation = 1.2 KHz | 21 dB | 25 dB | 4 dB |

The RDS sensitivity performance degrades between about 2 dB to 4 dB, compared to a 100 KHz filter path when a static (unchanging) 50 KHz channel select filter bandwidth is employed. By contrast, the type of embodiments of FIGS. 1, 2, 4 and 5 dynamically and selectively uses the 50 KHz bandwidth filter to enhance audio sensitivity when audio is soft (lower frequency deviation) and uses the 100 KHz bandwidth filter otherwise, so as to keep RDS sensitivity high.

Some embodiments can provide both a dynamic audio channel select filter and an RDS channel select filter in low reception conditions. In more favorable conditions, a wider channel select filter mode is enabled to cover both the audio and RDS.

In FIG. 11, a graph of simulation results shows the probability of occurrence of audio clicks as a function of RF SNR, and plots of such click probability are shown for two filter bandwidths. The 50 KHz channel select filter bandwidth has ~3 dB better performance that reduces probability of audio clicks when compared with the 100 KHz channel select filter bandwidth. At lower received audio levels near the audio sensitivity of the receiver, the audio quality can be subject to occurrences of audio clicks even with static antenna and front-end noise present, so it is important to minimize such audio clicks. Such clicks might also occur due to pulling of the RF synthesizer frequency under some co-existence scenarios, and click effects are reduced by 50 KHz Mode 1 herein prior to FM demodulation 270. (Compare with click-reducing circuitry operating on demodulated audio as in incorporated patent application TI-69708 India PS.) Minimization of the audio clicks herein also benefits from the equalization of the group delay of each filtered Signal path via CSF2 and ISF2, for low probability of clicks when mux 260 switches under control of state machine 300.

The electrical current consumption of baseband module 200 is power managed in FIG. 4 and TABLES 2, 3, 5, 6, 7, 8 and 10A-10C. When the ISF and IQI modules 275, 285 are not used, they are clock-gated. The additional current consumption at low signal strengths (with the audio sensitivity enhancement Mode 1 enabled) due to the ISF and IQI appears to be about a quarter of a milliampere (~0.25 mA) in one example, which is quite acceptable in view of a remarkable 2 dB audio sensitivity improvement observed as described herein.

Listening tests are suitably performed with the proposed technique (dynamic switching between 100 KHz and 50 KHz filters) on various types of audio clips. For example, an audio clip is pre-emphasized, FM modulated, degraded by additive white noise, filtered by the channel select filter CSF, FM demodulated and appropriately de-emphasized. The amplitude of the audio signal is normalized so that peak audio deviation corresponds to a value of 75 KHz. The audio clips are processed using a fixed 100 KHz channel select filter alone or the dynamic filtering embodiment of FIG. 4 for comparison, and each of the clips under different noise conditions.

Eight independent listeners were asked to evaluate the quality of an audio clip, by scoring over an absolute scale of 1 (Worst) to 5 (Best). The test was conducted in a blind fashion, i.e., the listeners were not aware of the test condition. TABLE 12 shows that the listening tests also indicate a 2 dB improvement in audio sensitivity, based on the approximately equal Average Score entries (1.9, 1.7) in TABLE 12 for processing using the dynamic filtering method at 5 dB RF SNR versus a 100 KHz filter at 7 dB RF SNR. Indeed, those Average Score entries (1.9, 1.7) even somewhat favored the dynamic filtering method at the lower RF SNR of 5 dB over the 100 KHz filter at 7 dB. Moreover, with RF SNR the same, the Average score was dramatically higher (almost 2 listening-response units) for the dynamic filtering method versus the 100 KHz channel select filter alone.

TABLE 12

LISTENING TEST RESULTS

| Condition | RF SNR | Avg. Score |
|---|---|---|
| Original Audio Clip | N/A | 4.9 |
| Processed using 100 KHz | 5 dB | 0.3 |
| Processed using Method incl. 50 KHz Filter | 5 dB | 1.9 |
| Processed using 100 KHz | 7 dB | 1.7 |
| Processed using Method. incl. 50 KHz Filter | 7 dB | 3.4 |

Figure 12:
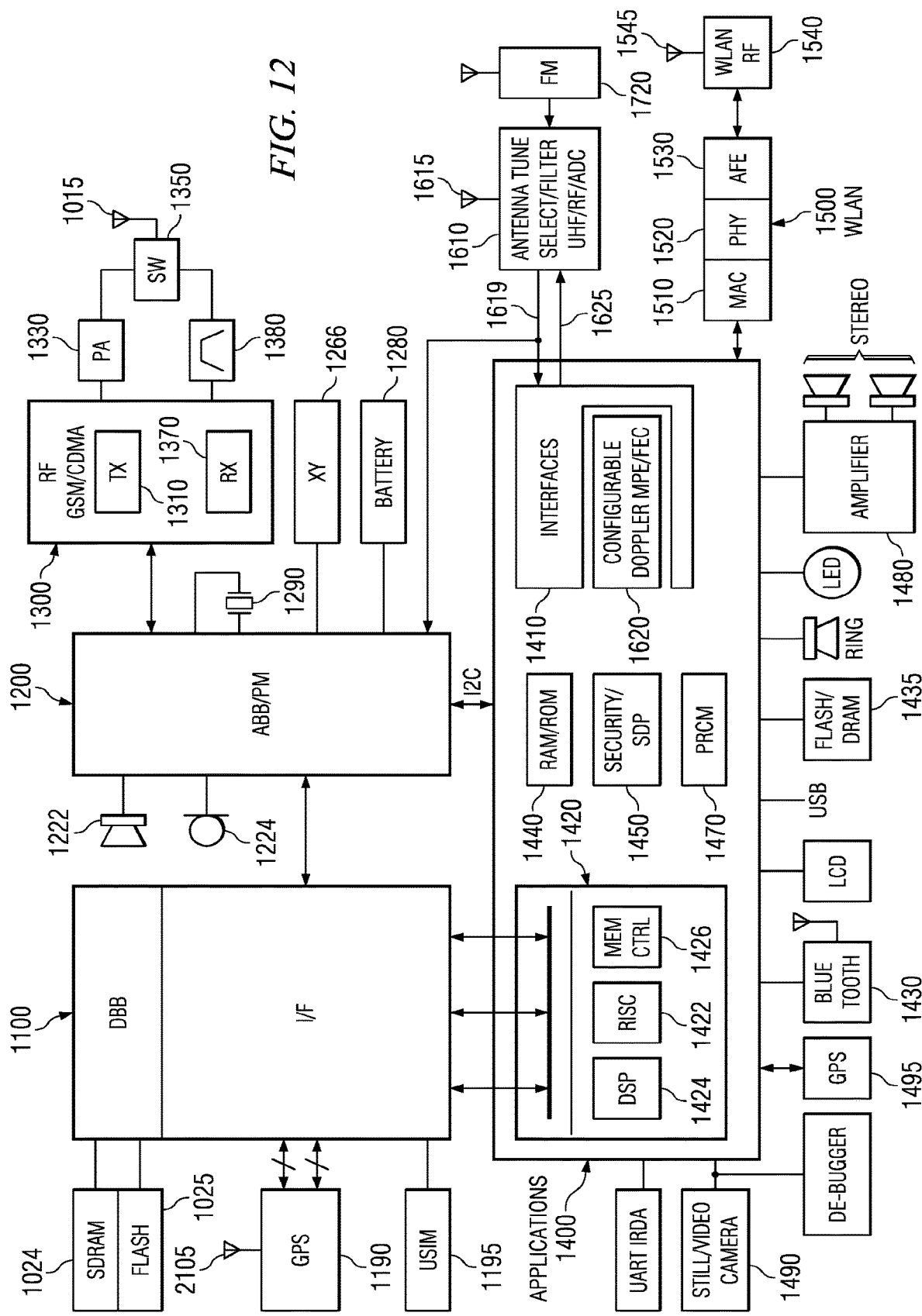
FIG. 12 is a block diagram of a system, or a SOC IC (system-on-a-chip integrated circuit), embodiment with circuits and processes as shown in any of the other Figures.

A multi-radio system embodiment is provided in a single-chip FM+WLAN+BT+GPS transceiver, for example, such as in FIG. 12.

In FIG. 12, a system context suitably includes the FM receiver of FIGS. 1 and 2 and coexisting radios such as BT/WLAN, and is depicted by way of example and not of limitation. It is contemplated that the skilled worker uses each of the integrated circuits shown in FIG. 12, or such selection from the complement of blocks therein provided into integrated circuit modules, or provided into one single integrated circuit module, in a manner optimally combined or partitioned between the modules, to the extent needed by any of the combo SOCs, cellular telephones, radios and televisions, Internet audio/video content players, fixed and portable entertainment units, WLAN gateways, routers, pagers, personal digital assistants (PDA), tablets, organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages. For some background on system on chip technologies, see U.S. Patent Application Publication 20080307240 (TI-60478) "Power Management Electronic Circuits, Systems, and Methods and Processes of Manufacture," which is incorporated herein by reference in its entirety.

In FIG. 12, a cell phone modem 1100, 1200, 1300 is suitably interfaced with an applications processor 1400 and various radios for WLAN 1500, Bluetooth 1430, GPS 1495, FM 1720 (for receiver 10 in FIG. 1), and others. Applications processor 1400, for example, can include a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller 1426 with DMA (direct memory access), and a graphic accelerator for a 2D or 3D (two/three-dimensional display) 1266. The RISC processor 1422 and the DSP 1424 suitably have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On-chip RAM/ROM 1440 provides on-chip storage, and interfaces 1410 couple the processors 1422 and 1424 to the off chip peripherals. A USIM (universal subscriber identification module) 1195 is coupled with an interface portion of DBB/IF 1100.

In FIG. 12, circuitry for digital baseband DBB/IF 1100, analog baseband/power management ABB/PM 1200, and RF TX/RX 1300 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service HSDPA/HSUPA (High Speed Downlink Packet Access, High Speed Uplink Packet Access) (or 1×EV-DV, 1×EV-DO or 3×EV-DV), via an analog baseband chip and GSM/CDMA transmit/receive chip (in cell modem). SDRAM 1024 and flash memory 1025 suitably provide memory support for DBB/IF 1100. FIG. 12 provides a representative detail of parts of RF TX/RX for any of the wireless modems such as RF TX/RX 1310/1370, WLAN RF 1540, Bluetooth 1430, and others. A switchplexer or circulator 1350 couples RF power amplifier 1330 and RX 1370 with bandpass filter 1360 to a cell phone antenna 1015.

An audio/voice block in ABB/PM 1200 is suitably provided to support audio and voice functions and interfacing. A microphone 1224 and an audio output transducer 1222 are coupled with ABB/PM 1200. Speech/voice codec(s) and speech recognition are suitably provided in memory space in an audio/voice block in ABB/PM 1200 for processing. Applications processor 1400 in some embodiments is coupled to location-determining circuitry for satellite positioning such as GPS (Global Positioning System) 1190 or 1495 and/or to a network-based positioning (triangulation) system, to an accelerometer, to a tilt sensor, and/or other peripherals to support positioning, position-based applications, user real-time kinematics-based applications, and other such applications.

ABB/PM 1200 includes a power conversion block, power save mode control, and oscillator circuitry based on crystal 1290 for clocking the cores. A display 1266 is provided off-chip. Batteries 1280 such as a lithium-ion battery provide power to the system and battery data.

Further in FIG. 12, chip (or core) 1400 interfaces to high-speed WLAN 802.11a/b/g/n (Wi-Fi) MAC (media access controller) 1510, PHY 1520, AFE 1530, WLAN RF 1540 and a WLAN antenna 1545. Other data wireless interfaces are suitably provided for coe-existing IEEE 802.15 (Bluetooth and low and high rate piconet, Zigbee, and personal network communications) wireless circuit. Other interfaces suitably include a MCSI voice interface, a UART interface for controls and data to position unit GPS 1495 and otherwise, and a multi-channel buffered serial port (McBSP) for data.

FM radio 10 of FIGS. 1 and 2 has a front end 1720 in FIG. 12 that is coupled with a DVB front end 1810, and they are together coupled with ABB/PM mixed signal chip 1200 and/or applications processor 1400 by control line 1625 and input lines 1619. A configurable Doppler MPE/FEC circuit 1620 supports the DVB. Further in peripherals, a MicroWire 1622 (u-wire 4 channel serial port), and USB, and a multi-channel buffered serial port (McB SP) to audio codec, a touch-screen controller, and audio amplifier 1480 to stereo speakers. External audio content and touch screen (in/out) and LCD (liquid crystal display), organic semiconductor display, and DLP™ digital light processor display from Texas Instruments Incorporated, are suitably provided in various embodiments and coupled to interface of core 1400 for fixed, portable, mobile and/or vehicular use. An interface provides EMT9 and Camera interfacing to one or more off-chip still cameras or video cameras 1490, and/or to a CMOS sensor of radiant energy. PRCM 1470 (power, resets and control module) provides power management.

In FIG. 12, in some embodiments, GPS 1495 operates in close coordination with any one, some, or all of WLAN, WiMax, DVB (digital video broadcasting), or other network, to provide positioning, position-based, and user real-time kinematics applications. Still other additional wireless interfaces such as for wideband wireless such as IEEE 802.16 WiMAX mesh networking and other standards are suitably provided and coupled to the applications processor integrated circuit and other processors in the system.

Various production-testable and/or field-testable system embodiments with one or more SOCs are provided on a printed circuit board (PCB), a printed wiring board (PWB), and/or in an integrated circuit on a semiconductor substrate.

Returning to FIG. 2, a non-limiting example of the output of the I/Q ADCs of FIG. 1 is at a rate of approximately 160 MSps. Any of various multiples of 32 KHz are conveniently used. This is decimated in FIG. 2, e.g. by a factor of 13 for AGC and RSSI for controls for the radio of FIG. 1. Further decimation, e.g. by 16, takes the data rate down to 768 KHz for further processing at low-IF as shown. The CSF/ISF LPFs cut the rate to 384 KHz to the FM demodulator and SQI and IQI, and a 1VIPX LPF divides by two to deliver 192 KHz to remaining blocks downstream. The various rates are selected to accommodate the desired signal processing results and economy of implementation.

Also in FIG. 2, a non-limiting example of a complex digital de-rotator 210, or down-converter, has an associated programmable trigonometric SIN and COS generator that supplies values of sine and cosine for the de-rotator 210. The de-rotation is respectively followed by the respective low pass filters CSF and ISF to respectively pass the channels for Signal and Image for measurements and scanning. Multiplexing 260 in FIG. 4 selects one or the other (of channel signal or image) for FM demodulation and noise meter. Subsequent to scanning, and in regular reception, the Signal path in FIG. 4 is fed through to ultimate stereo decoding, etc., downstream. The input of the down-converter 210 is complex and the output of the down-converter is also complex for both the signal and image components as in Equations (1-Sig_I and _Q) and (1-Img_I and Q). The output becomes real at the output of the FM demodulator. Circuits or processing software with summers and multipliers straightforwardly implement the electronic operations represented by Equations (1-Sig_I and _Q) and (1-Img_I and _Q).

Notice the instances of dimensionless ratios of the form $f/F_{samp}$ in Equations (1-Sig), (1-Img) and (3-Sig), (3-Img). Such ratio f/Fsamp is the fraction of a unit circle in which the 'sampling' of the unit circle successively occurs as indexed by index n for de-rotating the quadrature channels of the FM IF signal. Each sine or cosine trigonometric argument is the latest phase to the SIN and COS generator, with subscripted frequency f or $f_{IF}$ as a parameter. $F_{samp}$ in the ratio is the rate of 'sampling' or accessing values from the SIN and COS LUT(s) for de-rotation and is suitably about the same as or higher than the sampling rate Fsamp such as 768 KHz input to the down-converter 210 in FIG. 2.

IQ de-rotation 210 of FIG. 4 eliminates a potential image in the CSF LPF filter passband through which the channel signal passes. The image is displaced 300 KHz=$2*f_{IF}$ as in FIG. 3 and is rejected by the CSF LPF. Analogously, for isolating the Image for output, IQ de-rotation 210 outputs the image at low frequency and thus in the ISF passband at the Image output of de-rotation 210. At that Image output, de-rotation 210 eliminates the channel signal from lying in the ISF LPF filter passband. That channel signal instead is displaced 300 KHz=$2*f_{IF}$ and is rejected by the ISF LPF.

Think conceptually of separate de-rotation frequencies fills, fad being applied to respectively convert signal and image to DC:

$$\text{Sig}_{out\_I}(n) = I_{in}(n)\cos(2\pi n\, f_{drS}/F_{samp}) + Q_{in}(n)\sin(2\pi n\, f_{drS}/F_{samp}) \quad (1\text{-Sig\_I})$$

$$\text{Sig}_{out\_Q}(n) = Q_{in}(n)\cos(2\pi n\, f_{drS}/F_{samp}) - I_{in}(n)\sin(2\pi n\, f_{drS}/F_{samp}) \quad (1\text{-Sig\_Q})$$

$$\text{Img}_{out\_I}(n) = I_{in}(n)\cos(2\pi n\, f_{drI}/F_{samp}) + Q_{in}(n)\sin(2\pi n\, f_{drI}/F_{samp}) \quad (1\text{-Img\_I})$$

$$\text{Img}_{out\_Q}(n) = Q_{in}(n)\cos(2\pi n\, f_{drI}/F_{samp}) - I_{in}(n)\sin(2\pi n\, f_{drI}/F_{samp}) \quad (1\text{-Img\_Q})$$

Notice that the structure of the complex digital derotation Equations (1-Sig) and (1-Img) down-converts one channel apiece into the LPF passband of CSF and ISF respectively. A way of thinking of this pictures the channels as represented by single tones therein at $I_{in}=\cos(2\pi n\,[fs, f_{Img}]/F_{samp})$ and $Q_{in}=\sin(2\pi n\,[fs, f_{Img}]/F_{samp})$. Equations (1-Sig) and (1-Img) then represent a trig identity of frequency subtraction, and the de-rotation frequencies $f_{drS}$, $f_{drI}$ for that subtraction are chosen to prevent confusion of the channel signal and the image which are spaced apart. Notice that no limitation is at this point of description placed on the choice of the derotation frequency or frequencies of various embodiments. An embodiment can capture one or more channels at specific distances apart in frequency and provide an appropriate arrangement of the processes used in FIG. 2 and FIGS. 4-6. The way that de-rotation 210 obtains these outputs is represented by Equations (1-Sig) and (1-Img), and a special case is more specifically laid out next.

Let de-rotation frequencies for signal and image $f_{drS}$, $f_{drI}$ be set so that conversion of the image $f_{Img}$ to DC occurs (i.e. $f_S-f_{drS}=0$; $f_{Img}-f_{drI}=0$). The other frequency difference $(f_S-f_{drI})$ or $(f_{Img}-f_{drS})$ is 300 KHz away and readily rejected by FIG. 4 LPF ISF or CSF respectively.

$$[(f_S-f_{drS}),(f_{Img}-f_{drS})]=[0,300\,\text{KHz}] \quad (2\text{-Sig})$$

$$[(f_S-f_{drI}),(f_{Img}-f_{drI})]=[-300\,\text{KHz},0] \quad (2\text{-Img})$$

Let the signal and image frequencies be merely of opposite signs so both exist in the low-IF passband. This leads to opposite-signed de-rotation frequencies with a frequency magnitude $f_{IF}$ that are then substituted into Equations (1-Sig) and (1-Img) and simplified, with the resulting electronic circuitry in block 210 represented by Equations (3-Sig) for frequency addition and (3-Img) for frequency subtraction:

$$\text{Sig}_{out\_I}(n) = I_{in}(n)\cos(2\pi n\, f_{IF}/F_{samp}) + Q_{in}(n)\sin(2\pi n\, f_{IF}/F_{samp}) \quad (3\text{-Sig\_I})$$

$$\text{Sig}_{out\_Q}(n) = Q_{in}(n)\cos(2\pi n\, f_{IF}/F_{samp}) - I_{in}(n)\sin(2\pi n\, f_{IF}/F_{samp}) \quad (3\text{-Sig\_Q})$$

$$\text{Img}_{out\_I}(n) = I_{in}(n)\cos(2\pi n\, f_{IF}/F_{samp}) + Q_{in}(n)\sin(2\pi n\, f_{IF}/F_{samp}) \quad (3\text{-Img\_I})$$

$$\text{Img}_{out\_Q}(n) = Q_{in}(n)\cos(2\pi n\, f_{IF}/F_{samp}) - I_{in}(n)\sin(2\pi n\, f_{IF}/F_{samp}) \quad (3\text{-Img\_Q})$$

Notice that even in the special case, a number of versions of embodiments are feasible. Theoretically, a 100 KHz de-rotation frequency would be possible, to the extent that a clean filter separation can be accomplished when the channels are that wide in FIG. 4. Also, if single conversion from RF to 100 KHz is employed when the channels are that wide, the synthesizer frequency $f_{Lo}$ might pose blocking problems on the edge of the channels. A 150 kHz de-rotation as illustrated for FIG. 3 conveniently locates synthesizer frequency $f_{Lo}$ in the middle of an adjacent channel where blocking problems are less, and the 150 kHz de-rotation is compatible with subsequent low pass filtering CSF and ISF that can cleanly separate the signal and the image. In other embodiments of this type, low-IF de-rotation frequencies can also usefully be 200, 250, 300, or other greater-than-two multiple of at least 50 KHz, or such multiple of at least half a channel width.

In FIG. 5, power management is intelligently accomplished during processing by baseband 200 and elsewhere in FIG. 2. During frequency scan, various ones of the blocks of FIGS. 4 and 5 are powered up according to need or powered down. Conversely, during regular reception with audio sensitivity enhancement and dynamic switching herein, stereo decoding and RDS are activated, and power management disables or omits to execute any unneeded filtering and measurement processes as discussed elsewhere herein. These dynamically powered-down or selectively disabled processes include a frequency scanning state machine logic, the FIGS. 2 and 4 image signal parallel de-rotation portion, IQI, ISF1, noise meter and any other measurements that can be acceptably disabled conditionally during some intervals during regular reception.

Signal estimates such as windowed sums-of-squares for SQI and IQI are generated in any suitable manner, e.g.:

$$SQI = \sum_{nwindow} Sig^2(n) \quad (4\text{-SQI})$$

$$IQI = \sum_{nwindow} Img^2(n) \qquad (4\text{-}IQI)$$

FM modulated signals typically have a DC component, and so subtracting out a square of DC offset is not necessarily applied. Additionally, operations like $\log_2(SQI)$ and $\log_2(IQI)$ can provide quantities proportional to dB if desired. Each value of SQI_m_IQI can be a difference in dB, for one example.

In FIG. 2, a notch filter in the phase compensation path filters off symmetric spurs around DC to avoid spur-caused biased estimates of gain and phase imbalance.

In FIG. 2, the I/Q Imbalance Estimation block adjusts the amplitude of the quadrature Q signal to match the amplitude of the in-phase I signal. The gain compensation accumulates the average squares of I and Q and suitably applies gain compensation as a joint function of them. In one example, whichever is the signal I or Q for which the average square is less, that signal is multiplied by a gain factor $g_m$ equal to the square root of the ratio of the larger average square to the smaller average square.

The I/Q Imbalance Estimation block then adjusts the phases so they even more precisely differ by 90 degrees (quadrature). The electronic operations performed by the I/Q Imbalance Estimation block for compensating an IQ phase imbalance $-\delta$ (departure from 90 degrees) are represented, for instance, by:

$$Qout = \frac{Qin}{\cos(\delta)} + \tan(\delta)Iin \qquad (5)$$

wherein the phase imbalance estimation is continually measured prior to the compensation operations and the electronic estimation process is represented by:

$$\sin(-\delta) \sim = -G^* \text{Avg}[I^*Q]/\text{Avg}[I_{out}^2] \qquad (6)$$

Structures and processes described herein confer enhanced FM receiver performance, such as for FM transceiver cores in multi-radio or combo devices. Such enhanced performance enhances the user experience and can benefit a large proportion of users due to the increasingly high penetration of FM into mobile consumer electronics devices.

Other embodiments are contemplated, such as by utilizing a somewhat higher IF (e.g., $f_{IF}$=250 kHz or more with 100 kHz channel width), de-rotating the signal and image using a de-rotation frequency of $+/-f_{IF}$, and implementing the CSF and ISF paths in FIG. 4 each with at least one bandpass filter (e.g. 100-200 kHz or 200-300 KHz) as well as at least one low pass filter (e.g., 0-100 kHz). The bandpass filter can be provided directly or as a high pass filter cooperating with the IF low pass filter in the front end 20 of FIG. 1 to effectively deliver a bandpass.

Still more embodiments can have two or more separate de-rotation frequencies $f_{drS}$, $f_{drI}$ to more generally implement the complex digital de-rotation Equations (1-Sig) and (1-Img) for down-conversion 210. Some embodiments suitably provide a the front end 20 with at least one stage for higher frequency IF preceding the downconversion to low-IF in FIG. 1, thus providing a dual or triple conversion receiver.

Some other embodiments are provided to improve the demodulated signal to noise ratio for modulating signals besides audio or that are derived from audio. Yet other embodiments are suitably provided to operate with other kinds of modulations such as phase modulation, frequency shift keying (FSK), frequency division multiplex, quadrature amplitude modulation (QAM), or other type of modulation or system that varies in its currently-occupied bandwidth or frequency deviation or has some component that so varies in a manner that can benefit from dynamically adjustable filtering of a frequency width as taught herein. Bit error rate of some forms of data receiver path are suitably reduced by employing embodiments based on the teachings herein.

Some of the embodiments can be described as adjusting a characteristic of a module such as a filter dynamically, depending on a signal condition that depends on a varying approximate bandwidth occupied by the signal. This bandwidth is suitably measured in a time window. This signal condition with varying approximate bandwidth is represented in FIG. 5 by the determination whether signal difference IQI-SQI exceeds a threshold value or not. Since IQI is based on 50 kHz filter bandwidth and SQI is based on 100 kHz filter bandwidth, taking the difference (IQI-SQI) is one way of sensing the approximate bandwidth occupied by a signal regardless of the type of modulation. Accordingly, some embodiments use an automatic electronic measurement that senses the approximate bandwidth of the signal independent of the type of modulation either by itself or with some other measurement that either depends or does not depend on the type of modulation.

In an embodiment in which the characteristic of the module having one or more filters is adjusted, the characteristic in some versions is the width of an effective filter passband established by the one or more filters. The width of the effective filter pass band can be the adjustable bandwidth of a bandpass filter instantiated in a single module or compositely established by two or more modules. In FIG. 4, an effective filter pass band is conveniently established as a low pass filter cutoff frequency, e.g. 50 kHz at ISF2 or 100 kHz at CSF2.

In the particular case of FM, the varying approximate bandwidth is also related to the envelope of the demodulated audio signal or some function of the stereo L and R audio channel signals. For the embodiment of FIGS. 4-5, this envelope measure is used to derive an estimate of frequency deviation that is employed sometimes in combination with difference (IQI-SQI) on a dynamic basis. In signals with other types of modulation besides FM, the approximate bandwidth of the incoming signal can depend on some other parameter such as data rate, demodulated bandwidth or otherwise. Some embodiments can employ an automatic electronic measurement process that operates on the demodulated signal, measures a parameter of the demodulated signal from which the approximate bandwidth of the signal prior to demodulation can be derived, and then electronically derives the approximate bandwidth of the signal prior to demodulation. In FIG. 5, one more controls are derived as a joint logic function including both a first condition involving a measure or measures (e.g., a signal strength difference based on IQI and SQI) performed on a modulated signal at IF, and a second condition involving a measure or measures (e.g., scaled audio envelope detection) performed on a demodulated signal.

Some other embodiments utilize an estimate of FM frequency deviation based on the demodulated audio but omit the difference measurement IQI-SQI. Such embodiments default, for instance, to 100 kHz filter bandwidth unless the audio deviation estimate goes below an e.g. 40 KHz threshold whereupon the circuit switches to 50 kHz filter bandwidth. The circuit estimates a trajectory of the audio deviation from its current rate of change, and at the rate of change is positive and the audio deviation goes above, say 45 KHz with the rate of change still positive, then the circuit switches to 100 kHz filter bandwidth until some later time when the audio deviation estimate goes back below the e.g. 40 kHz threshold. Some of the embodiments situate a programmable (50 kHz, 100 kHz) bandpass filter module prior to the down converter 210 and route the Signal output from down converter 210 directly to mux 260 and FM demodulator 270. For frequency scanning, various controls can be set to establish whatever arrangement and types of modules that are desired since the frequency scanning does not necessarily involve user listening to a received audio signal during the scan.

References to a 'mux' herein should be understood to include either 1) actual circuit hardware that performs switching in the form of a multiplexer, or 2) one or more decision steps or specified operations in software or firmware that effectively perform analogous digital signal path control. 'Module' refers to either circuit hardware or one or more portions of software or firmware for performing the function to which the module pertains.

Still other embodiments utilize a data channel such as RDS in FIGS. 2-3 to send information derived at the transmitter instead of the receiver to tell the receiver which filter mode to use. Since the control information occupies a low bandwidth itself, it can be economically and conveniently sent in a manner that is recognized by a compatible receiver embodiment with a suitable data detector to control the circuitry 200 of FIG. 4 for this purpose. In that approach, the transmitter is upgraded conveniently to provide a compatible transmitter embodiment that sends out low bandwidth data that represents the frequency deviation or other measure or indicia based on the transmitted signal bandwidth. Indeed, all the controls that the state machine 300 generates in FIG. 4 can be derived ahead of time in such a transmitter embodiment. One receiver embodiment is like that of FIG. 4 with an altered state machine 300 or no state machine 300 at all. The data is received and coupled to a control register that provides the controls such as Mode, InpSel, and FltMode. Audio deviation block 295 is omitted or used for other purposes in this type of embodiment. The improved transmitter is downward-compatible in the sense that the additional data is sent in such a way that legacy receivers ignore it, while a receiver embodiment as taught herein detects that additional data and utilizes it for control purposes.

Regarding processor 80, the circuitry and processes are operable with RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays. The compressed scan chain diagnostic circuitry is useful in other types of integrated circuits such as ASICs (application specific integrated circuits) and gate arrays and to all circuits with structures and analogous problems to which the advantages of the improvements described herein commend their use.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, having, has, with, or variants thereof are used in the detailed description and/or the claims to denote non-exhaustive inclusion in a manner similar to the term comprising. The appended claims and their equivalents are intended to cover any such embodiments, modifications, and embodiments as fall within the scope of the invention.

What is claimed is:

1. A method comprising:
receiving an audio signal carried by a frequency modulated (FM) channel;
comparing an audio deviation of the FM channel to a predetermined amount; and
in response to a determination that the audio deviation of the FM channel is greater than the predetermined amount, increasing a bandwidth of a channel select filter for the FM channel.

2. The method of claim 1, further comprising demodulating an output from the channel select filter to deliver audio based on the received audio signal.

3. The method of claim 1, further comprising in response to a determination that the audio deviation of the FM channel is less than the predetermined amount, decreasing the bandwidth of the channel select filter for the FM channel.

4. The method of claim 1, further comprising demodulating an output from the channel select filter for the FM channel.

5. The method of claim 1, wherein the FM channel further carries a pilot signal and a radio data system (RDS) signal.

6. The method of claim 1, wherein increasing the bandwidth of the channel select filter comprises increasing the bandwidth from 50 kHz, to 100 kHz.

7. An apparatus comprising:
an antenna terminal; and
a controller coupled to the antenna terminal, the controller configured to:
determine that an audio deviation of a frequency modulated (FM) channel is less than a predetermined amount; and
in response to a determination that the audio deviation of the FM channel is greater than the predetermined amount, increase a bandwidth of a channel select filter for the FM channel.

8. The apparatus of claim 7, further comprising circuitry for demodulating an output from the channel select filter.

9. The apparatus of claim 7, wherein the controller is further configured to decrease the bandwidth of the channel select filter for the FM channel in response to a determination that the audio deviation of the FM channel is less than the predetermined amount.

10. The apparatus of claim 7, wherein the controller is further configured to demodulate an output from the channel select filter for the FM channel.

11. The apparatus of claim 7, further comprising an antenna coupled to the antenna terminal.

12. The apparatus of claim 7, wherein the channel select filter comprises a first filter, a second filter, and a first multiplexer, and wherein the controller is configured to increase the bandwidth of the channel select filter by changing a selection from the first filter to the second filter using the first multiplexer.

13. The apparatus of claim 12, further comprising an image select filter having an output coupled to the first filter.

14. The apparatus of claim 13, wherein the controller is configured increase the bandwidth of the channel select filter during a first mode of operation, and wherein, during the first mode of operation, the image select filter is configured to be disabled.

15. The apparatus of claim 14, wherein the controller is configured to:
perform frequency scanning during a second mode of operation in which the image select filter is enabled; and
after performing frequency scanning, transition to the first mode of operation.

16. The apparatus of claim 15, further comprising:
a second multiplexer having an output coupled to an input of the first filter, a first input coupled to the output of the image select filter, and a second input; and
a third filter having an output coupled to the second input of the second multiplexer and to the second filter, wherein, during the second mode of operation, the second multiplexer is configured to select the image select filter, and wherein, during the first mode of operation, the second multiplexer is configured to select the third filter.

17. The apparatus of claim 15, wherein the controller comprises a state machine configured to control a transition between the first and second modes of operation.

18. The apparatus of claim 12, wherein the first filter comprises a delay with respect to the second filter.

19. The apparatus of claim 18, wherein the delay is equal to 10 samples.

20. The apparatus of claim 7, further comprising an analog front end coupled between the antenna terminal and the controller, the analog front end comprising:
a low noise amplifier having an input coupled to the antenna terminal, and an output;
a quadrature down-converter having an input coupled to the output of the low noise amplifier, and an output;
a synthesizer coupled to the quadrature down-converter; and
an analog-to-digital converter (ADC) having an input coupled to the output of the quadrature down-converter, and an output coupled to the controller.

* * * * *